US012717462B2

(12) United States Patent
Lofiego et al.

(10) Patent No.: US 12,717,462 B2
(45) Date of Patent: Aug. 25, 2026

(54) USER INTERFACE SYSTEM AND METHOD FOR DRIVESHAFT PARTS OF A VEHICLE

(71) Applicant: Dana Heavy Vehicle Systems Group, LLC, Maumee, OH (US)

(72) Inventors: Anthony P. Lofiego, Maumee, OH (US); Spencer Fetters, Maumee, OH (US); Darryl Wray, Ypsilanti, MI (US); Michael Lamb, Maumee, OH (US); Steve Jansing, Maumee, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 238 days.

(21) Appl. No.: 18/403,279

(22) Filed: Jan. 3, 2024

(65) Prior Publication Data

US 2024/0241619 A1 Jul. 18, 2024

Related U.S. Application Data

(60) Provisional application No. 63/480,060, filed on Jan. 16, 2023.

(51) Int. Cl.

*G06F 3/0482* (2013.01)
*G06F 9/451* (2018.01)
*G06Q 30/0601* (2023.01)

(52) U.S. Cl.

CPC ............ *G06F 3/0482* (2013.01); *G06F 9/451* (2018.02); *G06Q 30/0641* (2013.01)

(58) Field of Classification Search

CPC ............................... G06F 3/0482; G06F 9/451
See application file for complete search history.

(56) References Cited

U.S. PATENT DOCUMENTS

| | | | | |
|---|---|---|---|---|
| 6,486,439 | B1 * | 11/2002 | Spear | H04L 67/02 219/136 |
| 8,768,955 | B2 | 7/2014 | Donehue | |
| 8,798,852 | B1 | 8/2014 | Chen et al. | |
| 2002/0007618 | A1 * | 1/2002 | Armington | B31D 5/0047 53/472 |
| 2002/0188528 | A1 * | 12/2002 | Adelman | G06Q 10/087 705/28 |

(Continued)

OTHER PUBLICATIONS

Rockauto (Rockauto.com published at least Jan. 4, 2021, web.archive.org/web/20210104203910/https://www.rockauto.com/) (Year: 2021).*

*Primary Examiner* — Seth A Silverman
(74) *Attorney, Agent, or Firm* — McCoy Russell LLP

(57) ABSTRACT

Systems and methods for a computing device are provided. The computing device, in one example is configured to display on a display screen a menu listing one or more characteristics of a driveshaft included in a database. The computing device is further configured to display a user interface that can be reached directly from the menu, wherein the user interface displays, for each of the one or more characteristics, a limited list of options available to be selected, the limited list of options obtained from the database. Each option in the limited list of options is selectable to launch a subsequent network page of the user interface and enables the selected option to be seen within the user interface. The user interface is displayed while the database is in an un-launched state.

20 Claims, 20 Drawing Sheets

(56) References Cited

U.S. PATENT DOCUMENTS

| | | | | |
|---|---|---|---|---|
| 2005/0125261 | A1 | 6/2005 | Adegan | |
| 2007/0073595 | A1* | 3/2007 | Moore | G06Q 50/40 705/26.42 |
| 2007/0203949 | A1* | 8/2007 | Regan | G06F 16/9554 |
| 2019/0095882 | A1* | 3/2019 | Parker | H04L 67/60 |
| 2020/0349626 | A1 | 11/2020 | Lagoni et al. | |
| 2021/0142295 | A1* | 5/2021 | Lalonde | G06Q 30/0633 |

* cited by examiner

FIG. 1B

USER INTERFACE SYSTEM AND METHOD FOR DRIVESHAFT PARTS OF A VEHICLE

CROSS REFERENCE TO RELATED APPLICATIONS

The present application claims priority to U.S. Provisional Application No. 63/480,060 entitled "USER INTERFACE SYSTEM AND METHOD FOR DRIVESHAFT PARTS OF A VEHICLE", filed on Jan. 16, 2023. The entire contents of the above-listed application is hereby incorporated by reference for all purposes.

TECHNICAL FIELD

Embodiments of the subject matter disclosed herein relate to systems and methods for driveshaft identification, specifically related to driveshaft part number identification via a web-based visual interactive search system specifically tailored to driveshaft components.

BACKGROUND AND SUMMARY

A motor vehicle, such as a heavy-duty truck, may include a driveshaft for transmitting power generated by an engine of the motor vehicle to a plurality of wheels. For example, rotation of the driveshaft may cause one or more axles coupled to the plurality of wheels to rotate, thus providing motive force to the plurality of wheels. However, over a lifetime of a motor vehicle, a condition of the driveshaft may be degraded. For example, exposure to mechanical and thermal stresses during motor vehicle operation may degrade the drive shaft such that driveshaft replacement is indicated. Further, in some examples, a degraded condition of the driveshaft may cause an unexpected and undesirable component degradation during vehicle operation. In order to reduce an incidence of such unexpected and undesirable component degradation, a driveshaft may be replaced regularly. Some motor vehicles include driveshaft monitoring systems that detect condition of the driveshaft, including indication of demand for replacement.

Driveshafts are installed with component identification, such as a sticker, that indicates an Original Equipment Manufacturer (OEM) part number, series number, etc. The component identification may be used in order to determine replacement specifics in the event that a driveshaft demands replacement. If the component identification is degraded, lost, or otherwise unavailable at the time of replacement, a process to determine replacement part specifics for a user (e.g., a vehicle owner) includes contacting the OEM in order to provide information of the existing driveshaft so that a replacement part fitting specified measurements, angles, and more may be determined. Because of a quantity of available options for driveshafts, the process can be time consuming and often inaccurate due to user unfamiliarity with part specifics. Installation or replacement of an incorrect driveline component may degrade vehicle performance and lead to premature component degradation.

The inventors herein have recognized the above-mentioned issues and have developed a web-based user interface for an interactive search system that simplifies identification of driveshaft parts of a vehicle based on a plurality of characteristics. The web-based interface includes images, text, selectable elements, and more to aide a user in identifying a driveshaft part and corresponding part number suitable for the vehicle in question.

In an example, a computing device includes a display screen that displays include a menu listing one or more characteristics of the driveshaft, the characteristics being selectable to launch a user interface. The user interface may include one or more network pages that are displayed in response to user selections. A first network page of the one or more network pages includes a plurality of selectable elements that when selected, trigger display of a second network page.

A method for identifying a driveshaft part number for a driveshaft to be replaced comprises identifying a plurality of characteristics specific to the driveshaft of interest and sequentially narrowing options for the OEM part number based on user selections to the one or more network pages of the user interface. The plurality of characteristics includes driveshaft position, U-joint type, U-joint series, tubing length, installed length, presence of tubing, tube diameter, collapsed length, driveshaft phase, and/or yoke angle, or some combination thereof. A database stored in non-transitory memory is accessible when in an un-launched state by the interactive search system, user selections triggering the interactive search system to filter available options of OEM part numbers in a sequential manner until the driveshaft part number for the driveshaft of interest is identified. The method may be carried out on a web-based or cloud computing platform and is executable by a processor of the computing device.

In another example, a web-based step-by-step visual interactive search system may display information relevant to the method described above. For example, the user interface may be displayed on a user device accessing the interactive search system, one or more network pages of the user interface visually displaying the selectable elements, instructional pictures/diagrams, and instructional videos that allow for a user to search for the OEM part number relevant to the driveshaft of interest in a step-by-step fashion. When selected, the selectable elements may launch subsequent network pages within the user interface and may further filter options of the driveshaft part number for the driveshaft of interest. For example, a first network page may include a first plurality of selectable elements indicating a first characteristic (e.g., position) of the driveshaft (e.g., driveshaft, inter axle shaft, and/or coupling shaft). When a user selects one of the first plurality of selectable elements, a second network page may be displayed that includes a second plurality of selectable elements indicating a second characteristic (e.g., U-joint series) of the driveshaft. The second plurality of selectable elements may be filtered and/or narrowed by the selected first characteristic in the first network page. A plurality of network pages with selectable elements are included in the interactive search system to sequentially filter options in the step-by-step fashion, ultimately providing the drive shaft part number for the driveshaft to be replaced.

The method and systems herein described provide simplification for identifying the driveshaft part number, reducing time spent and errors made by the user. Instructional pictures and videos decrease errors made by the user by providing information for proper measuring and determination of component specifics. Pop-up windows accessible within network pages provide information of subsequent characteristics and requirements for determining the subsequent characteristics, thereby reducing time spent in transitions and increasing accuracy of determinations. The web-based system decreases demand for the user to contact the OEM, therefore reducing time spent and errors in determining and/or searching for the driveshaft part number.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1B shows a block diagram of an example database structure.

DETAILED DESCRIPTION

Figure 10:
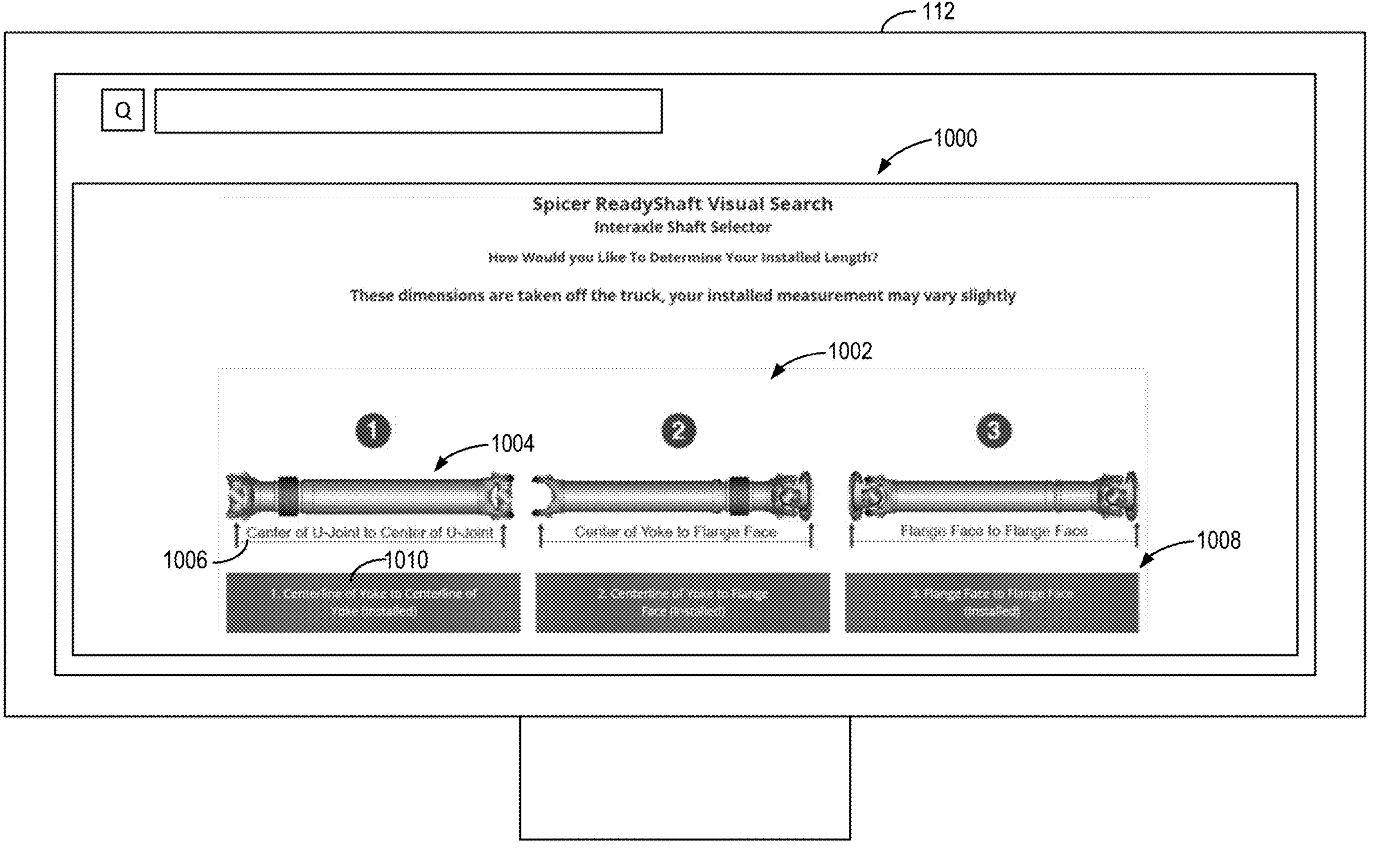
FIG. 10 shows an example of a ninth network page of the browser.
Figure 11:
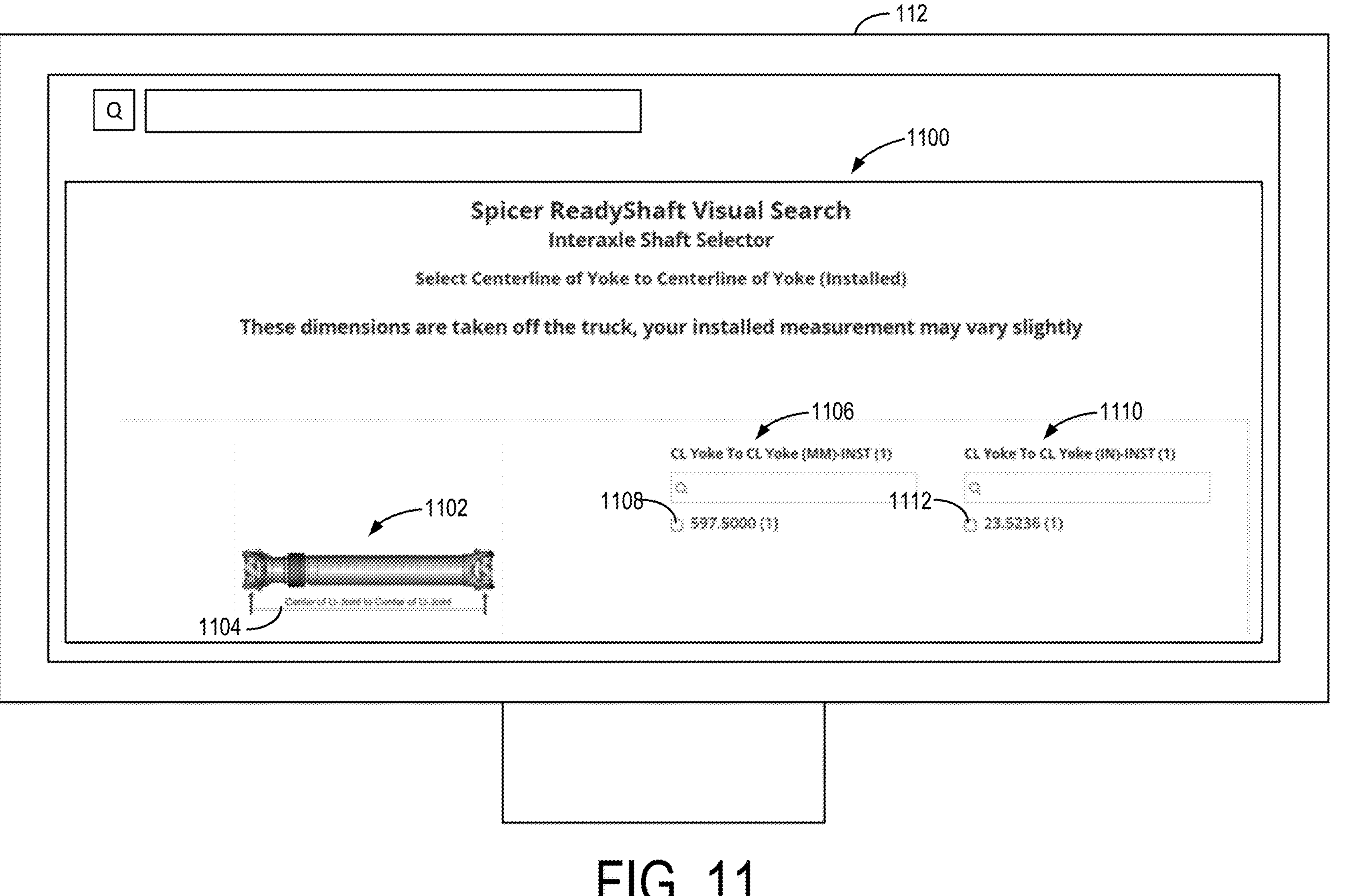
FIG. 11 shows an example of a tenth network page of the browser.

The following description relates to systems and methods for a web-based step-by-step interactive search system for identifying an original equipment manufacturer (OEM) part number for a driveshaft. The web-based step-by-step interactive search system herein disclosed may be executed by a computing system depicted in FIG. 1. The web-based step-by-step interactive search system includes one or more network pages of a user interface of a browser application displayed on a display screen of a display device of a user device in communication with the computing system. Examples of the one or more network pages are shown in FIGS. 2-9. A method for operating the web-based step-by-step interactive search system is shown in FIG. 10. A method for identifying the OEM part number for the driveshaft using the web-based step-by-step interactive search system is shown in FIG. 11.

Referring now to FIG. 1, an example of a computing system 100 is shown. Computing system 100 comprises a computing device 102 which may comprise, as illustrative and non-limiting examples, a server, a personal computer, a workstation, a mobile device (e.g., a cellular phone, a smart phone, a computing tablet, and so on), or any other type of computing device.

The computing device 102 includes a processor 104, which may be configured to execute machine-readable instructions stored in non-transitory memory 106. Processor 104 may be single core or multi-core, and programs executed thereon may be configured for parallel or distributed processing. In some examples, the processor 104 may optionally include individual hardware components that are distributed throughout two or more devices, which may be remotely located and/or configured for coordinated processing. In some examples, one or more aspects of the processor 104 may be virtualized and executed by remotely-accessible networked computing devices configured in a cloud computing configuration. The computing device 102 further includes non-transitory memory 106 and an interactive search system 105. The non-transitory memory 106 includes a database 108. The database 108 may include a list of a plurality of OEM part numbers, including characteristics of each of the plurality of OEM part numbers, which is accessible by the interactive search system 105. The characteristics may include, in some examples, driveshaft position, U-joint brand, U-joint/yoke series, tube length, installed length, slip yoke characteristics, presence of tubing, collapsed length, driveshaft phase, and/or yoke angle, or some combination thereof. It should be appreciated that the computing device 102 may include additional memory devices, including volatile memory, mass storage, local memory, and so on.

The interactive search system 105 may store executable instructions in non-transitory memory 106 that are executable by the processor 104. The interactive search system 105 may be configured to determine the OEM part number of the driveshaft as based on user inputs. The interactive search system 105 may be configured to receive information of the user inputs in order to identify the OEM part number via a sequential filtering process. In some examples, the non-transitory memory 106 may be coupled to the processor 104 such that instructions stored in the non-transitory memory 106 may be executed by the processor 104. The computing device 102 may be in communication with a network 110 to facilitate exchange of data with external machines (e.g., computing devices of any kind). A user device 112, such as a desktop computing device, a laptop computing device, a mobile device (e.g., a smart phone or tablet), or other suitable device, may also be in communication with the network 110 in order to access the database 108 included in the non-transitory memory 106. The network 110 may be a publicly accessible network of linked networks, in some examples operated by various parties, such as the Internet. As such, the interactive search system 105 is said to be web-based. In certain embodiments, the network 110 may include a private network, personal area network, local area network, wide area network, cable network, satellite network, cellular telephone network, etc. or combination thereof, each with access to and/or from the Internet.

The user device 112 may access the interactive search system 105 through the network 110. In some embodiments, a user interface 118 of a browser 116 may be used to view information from the interactive search system 105 and/or interact with the interactive search system 105. For example, the user device 112 may use the user interface 118 to interact with (e.g., select one or more selectable elements within) one or more network pages of the user interface 118 in order to provide information to the interactive search system 105 that may be used to identify the OEM part number of the driveshaft. For example, the processor 104 may receive user inputs to network pages of the user interface 118 and communicate information of the user inputs to the interactive search system 105. The user device 112 may further include a display screen 114 that may display the browser 116, including the one or more network pages of the user interface 118 that may be interacted with. The database 108 may be in an un-launched state while being accessed by the interactive search system 105 in response to user selections via the user interface 118.

Turning now to FIG. 1B, a diagram 150 of an example database as may be used for the interactive search system, such as database 108. The database 108 may comprise a plurality of modules, each of the modules storing a plurality of driveshaft characteristics and corresponding part numbers. For example, a first module 120 may comprise all available driveshaft OEM part numbers. A second module 122 may comprise data of each of a plurality of driveshaft positions and their corresponding part numbers. In this way, the first module 120 may track to the second module 122. A third module 124 may comprise data of each of a plurality of U-joint series and their corresponding part numbers such that the first module 120 tracks to the third module 124. A fourth module 126 may comprise data of each of a plurality of U-joint styles and their corresponding part numbers such that the first module 120 tracks to the fourth module 126. A fifth module 128 may comprise data of each of a plurality of tubing lengths and their corresponding part numbers such that the first module 120 tracks to the fifth module 128. A sixth module 130 may comprise data of a plurality of collapsed lengths and their corresponding part numbers such that the first module 120 tracks to the sixth module 130. A seventh module 132 may comprise data of a plurality of installed lengths and their corresponding part numbers such that the first module 120 tracks to the seventh module 132. An eighth module 134 may comprise data of a plurality of tubing diameters and their corresponding part numbers such that the first module 120 tracks to the eighth module 134. A ninth module 136 may comprise data of a plurality of yoke phases (e.g., in phase vs out of phase) and their corresponding part numbers such that the first module 120 tracks to the ninth module 136. A tenth module 138 may comprise data of a plurality of yoke angles and their corresponding part numbers such that the first module 120 tracks to the tenth module 138.

In some examples, the part numbers included in each of the second through tenth modules may overlap. As a non-limiting example, the second module 122 may comprise data of three different driveshaft positions, each of the three different driveshaft positions comprising numerous OEM part numbers available therefor. The sixth module 130 may comprise data of twenty different collapsed lengths, each of the twenty different collapsed lengths comprising numerous OEM part numbers available therefor. The OEM part numbers available for one of the collapsed lengths may overlap with one or more of the three drive shaft positions, wherein a driveshaft of a first position may have available part numbers, some of which correspond to the one of the collapsed lengths.

The interactive search system may sequentially filter the available part numbers in each module based on user selections. For example, user selection of a driveshaft position may indicate that only the OEM part numbers corresponding to that driveshaft position are options. As such, the available part numbers in each of the third, fourth, fifth, sixth, seventh, eighth, ninth, and tenth modules may be filtered to include only the part numbers corresponding to the selected driveshaft position. In this way, the database may allow the user to determine an OEM part number based on a plurality of characteristics which sequentially filter available options.

In some examples, an order in which the interactive search system presents characteristics may be tailored to most efficiently determine a single OEM part number. For example, filtering by driveshaft position first may filter out two thirds of the overall OEM part numbers available, whereas filtering by U-joint series first may only filter out a fifth of the overall OEM part numbers, as a non-limiting example. In this way, the interactive search system and the database 108 may increase processing power of the system by reducing number of user inputs and therefore displayed network pages needed to narrow to a single OEM part number.

FIGS. 2-15 illustrate representations of example network pages of a user interface displayed on a user device, such as user device 112. The network pages may be displayed in a browser, such as browser 116, which is displayed on a display of the user device, such as display screen 114 of user device 112. The various network pages may be used to allow a user to enter characteristics specific to the driveshaft. Elements of the network pages described herein can be integrated with network pages provided by an electronic commerce system. These elements can be integrated with the electronic commerce system's network pages so that the normal experience of browsing items within the electronic commerce system is enhanced by providing the ability to use the interactive search system herein described.

As described herein, elements of at least some of the network pages represent points of ingress into the interactive search system. This may allow a smooth and relatively seamless transition to using the interactive search system. For example, while searching for a driveshaft in the electronic commerce system, an element may be included on a network page that prompts a user to indicate whether they would like to identify the driveshaft using the interactive search system. If the user selects an element indicating that they would like to use the interactive search system, subsequent network pages may be displayed to sequentially filter OEM part number options based on user inputs, as is described below.

As described in further detail below, the user interface dynamically provides contextual information within a subsequent window displayed in a graphical user interface. The method may include displaying a first window containing graphical information in a first format within a graphical user interface on a computer screen relative to a vehicle with multiple driveline components presented as selection options, where responsive to a user hovering over one of the presented components (and not the other presented components), a second window is displayed within the graphical user interface that provides subsequent contextual information, such as questions and/or options about the component hovered over. The method may constantly monitor the user selection position to detect if the user hovers over another presented component, in which case the second window is updated to provide different subsequent contextual information, such as questions and/or options about the different component now hovered over. The contextual information in the second window may relate to questions and/or options that will be presented to the user in a third window that replaces the first window, the questions and/or options linked to the selected component from the first window. In an example, the third window, once actually displayed by, for example, replacing the first window (with the second window now no longer displayed) provides a graphical representation of the selected component, the contextual information that was presented in the second window as now a selection to be made and/or question to be answered (where the method may include now receiving, via the third window, that selection and/or answer), as well as further contextual information about the selected component beyond the contextual information that was presented in the second window. The method thus include automatically relocating, by a processor, the contextual information presented in the second window, to a different location in the third window and eliminating the third window upon a selection in the first window by the user.

Figure 1A:
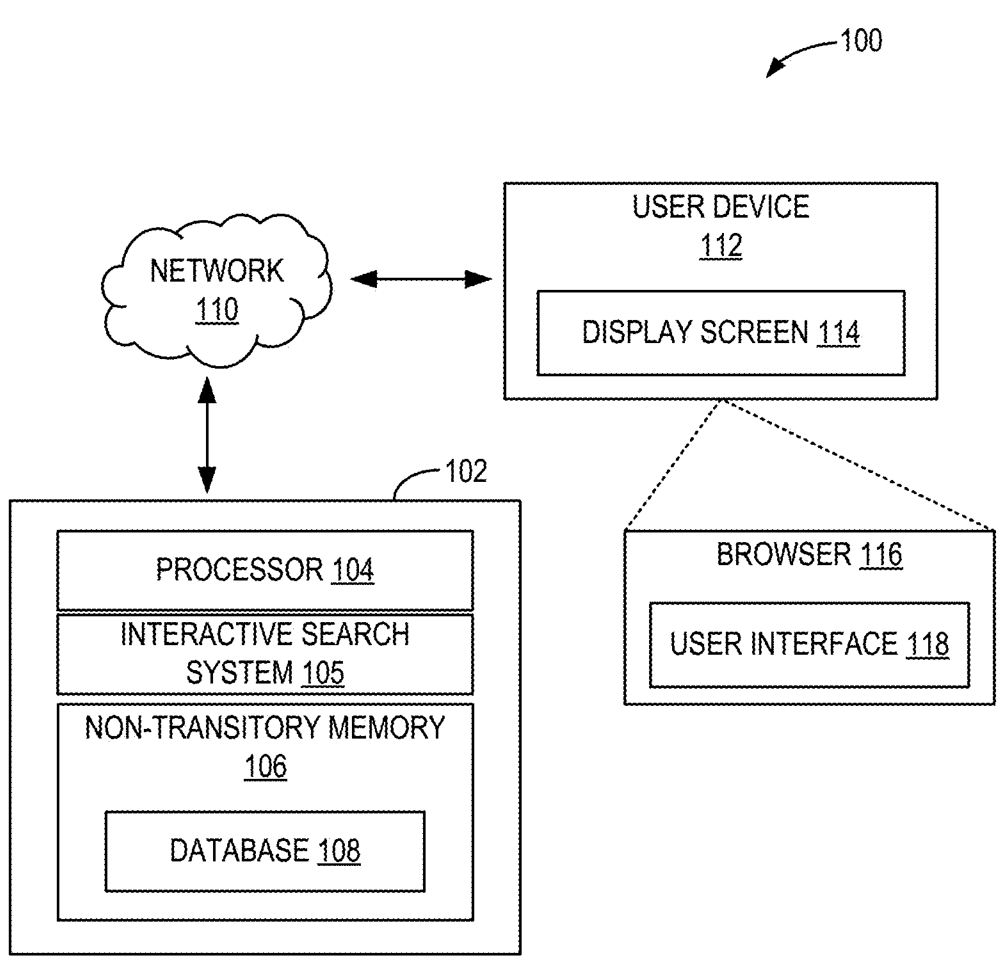
FIG. 1A shows a block diagram of an example computing system for identification of OEM part numbers.
Figure 1B:
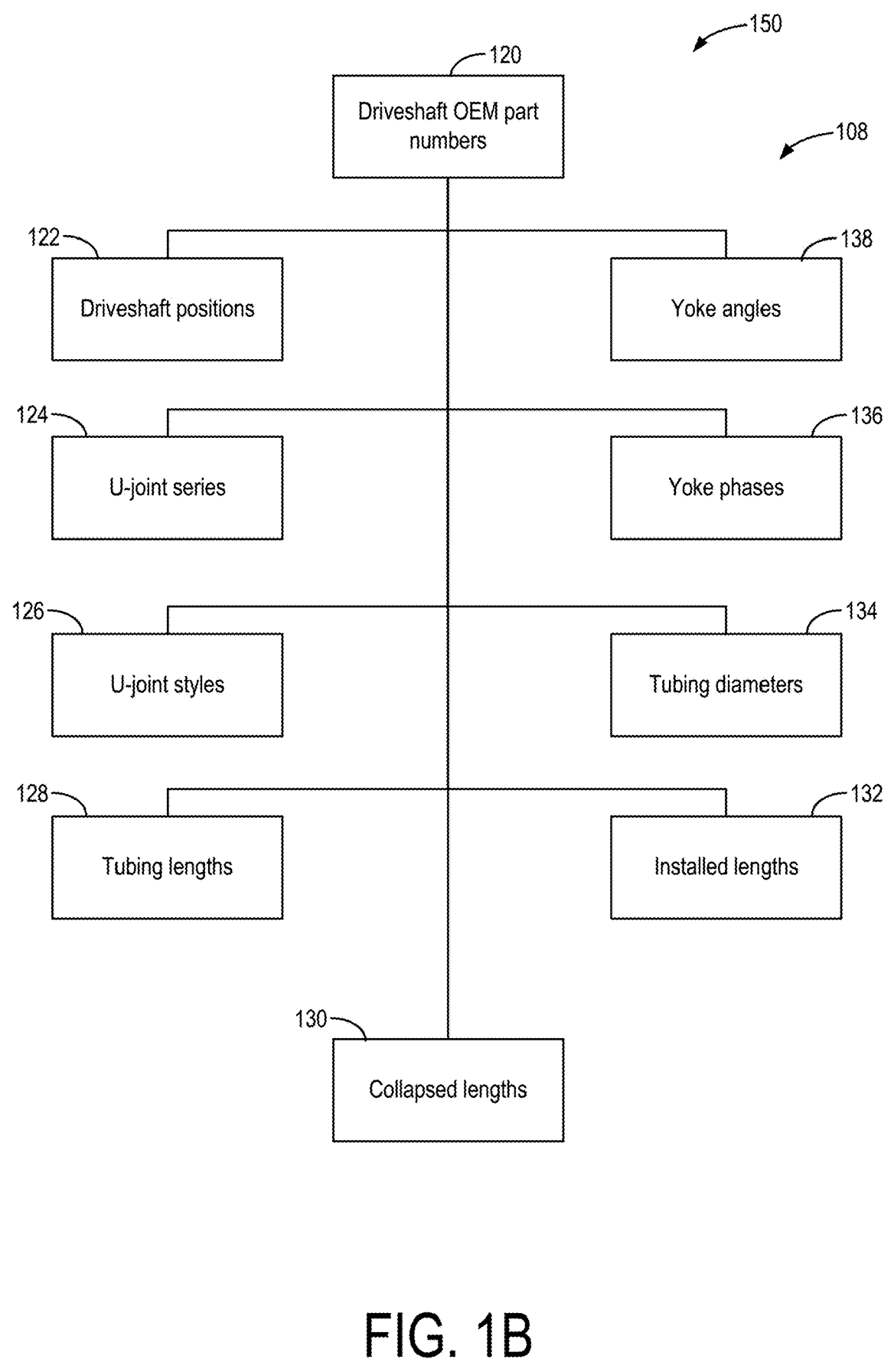
Figure 2:
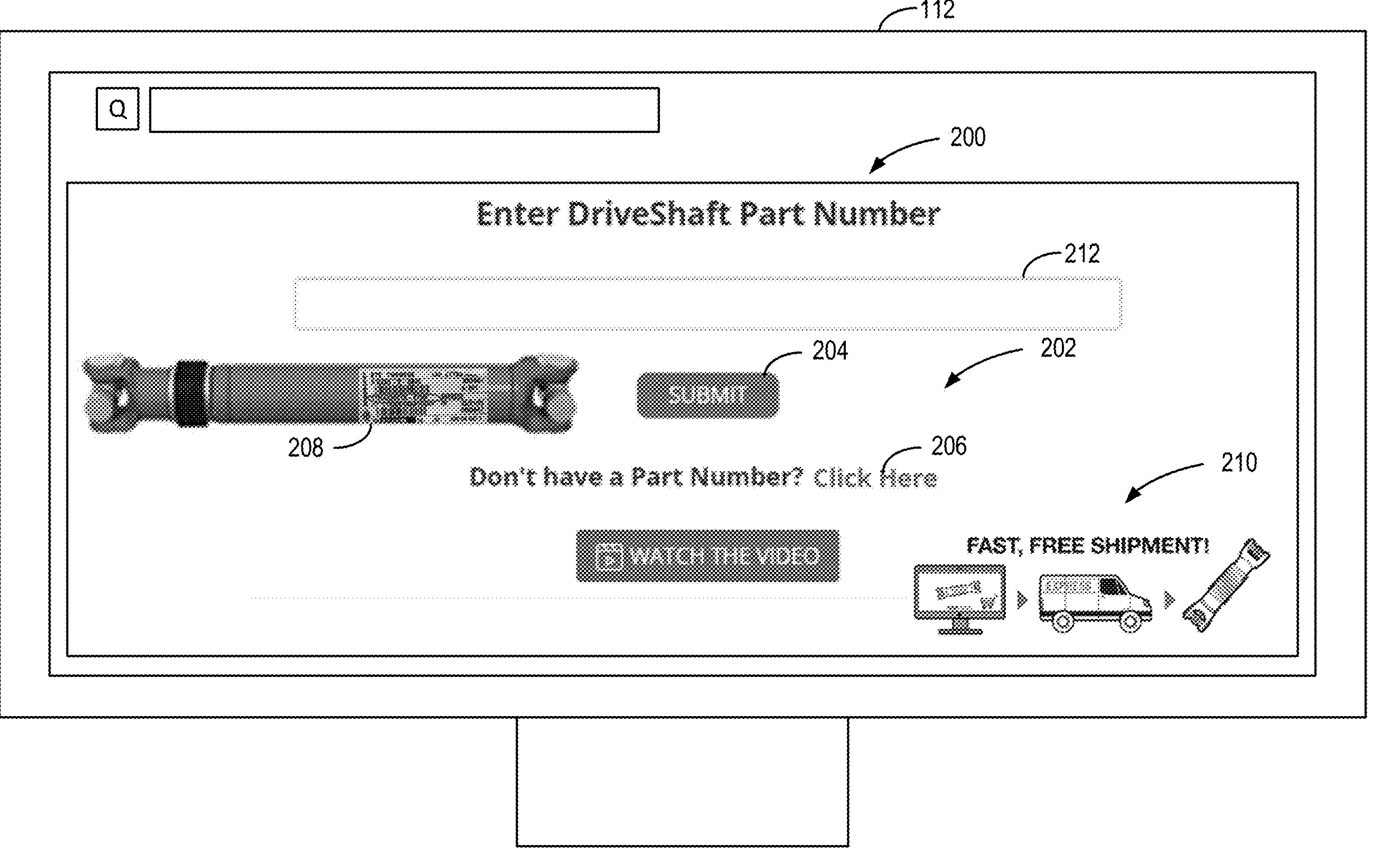
FIG. 2 shows an example of a first network page of a browser in communication with an interactive search system.

Turning now to FIG. 2, an example of a first network page 200 is shown. The first network page 200 may be a network page of a browser, such as browser 116 of FIG. 1, of a computing system, such as computing system 100 of FIG. 1. The first network page 200 may be accessed in response to user input indicating a demand to identify an OEM part number of a driveshaft using the interactive search system.

The first network page 200 may be displayed on the user device 112 and may include a plurality of selectable elements 202. The plurality of selectable elements 202 includes a first element 204 and a second element 206. The first element 204 indicates that the user knows an OEM part number of the driveshaft. The second element 204 indicates that the user does not know the OEM part number, which may be entered into search bar 212 by the user. The second element 206, when selected, triggers the computing system to display a subsequent network page in communication with the interactive search system. In some examples, the second element 206, when hovered over by an input device of the user device (e.g., a computer mouse) may display a menu listing one or more characteristics of driveshafts that are to be determined for the driveshaft in order to identify a corresponding OEM part number. The one or more characteristics may be included in a database of the interactive search system. In some examples, a user interface of the browser used to communicate with the interactive search system may be reached directly from the menu via selection of a characteristic in the limited list.

The first network page 200 further includes an instructional diagram 208. The instructional diagram 208 may provide information to the user regarding a location of a component identifier (e.g., an identification sticker). The instructional diagram 208 may indicate to the user where to look for the OEM part number to determine whether the part number is known or unknown.

Further elements of the electronic commerce system may also be included in the first network page 200, such as element 210. Element 210 may be an instructional graphic aimed to provide information for purchasing through the electronic commerce system and or a selectable link that, when selected, launches a commerce network page of the electronic commerce system.

Figure 3:
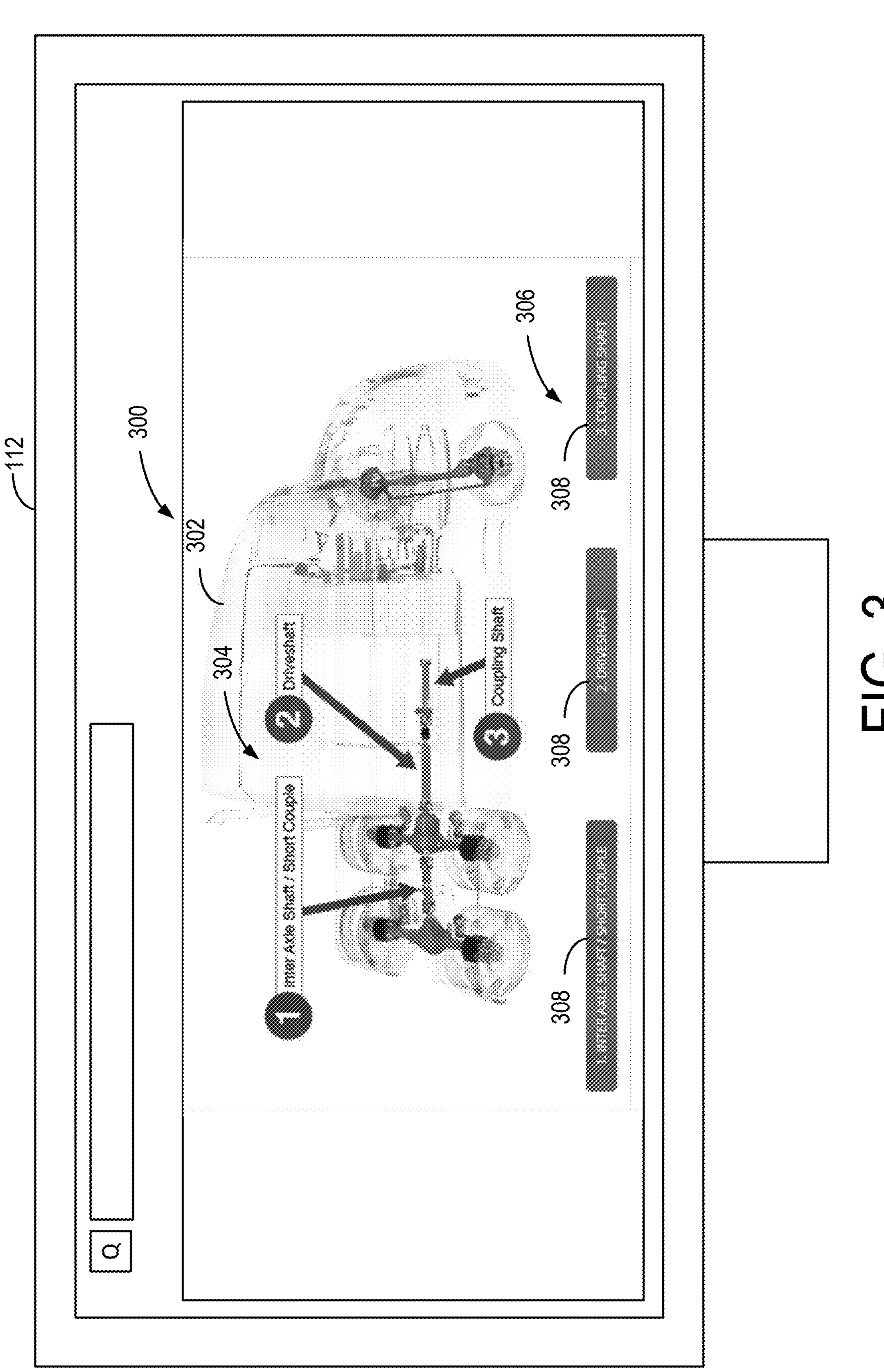
FIG. 3 shows an example of a second network page of the browser.

Turning now to FIG. 3, an example of a second network page 300 is shown. Second network page 300 may be displayed within the user interface, such as user interface 118. The second network page 300 may be displayed by the browser in response to user input to the first network page 200. For example, the second network page may be displayed in response to user selection of the second element 206. The second network page 300 may display a first step in a step-by-step system (e.g., the interactive search system) used to identify the OEM part number of the driveshaft. As such, the second network page 300 may display contextual information relevant to the first step of the interactive search system.

In some examples, the first step in the step-by-step system may be to identify a first characteristic of the driveshaft, e.g., a position of the driveshaft. In some examples, options for position of the driveshaft may include inter axle shaft, driveshaft, and coupling shaft. In other examples, more, less, or different options may be available and displayed.

The second network page 300 may comprise one or more instructional diagrams 302, one or more instructional labels 304 corresponding to the instructional diagrams 302, a menu 306, and a plurality of selectable elements 308. In some examples, the one or more instructional labels 304 provide information regarding the options for position of the driveshaft, each of the one or more instructional labels 304 corresponding to one of the options depicted in the instructional diagrams 302. In some examples, the instructional labels 304 and/or the instructional diagrams 302 may include selectable elements that when hovered over, modify the second network page 300 to display a pop-up window. The pop-up window may provide additional information regarding one of the options for position, including but not limited to information related to a second characteristic of the driveshaft.

As an example, hovering over a selectable element corresponding to a position of the options for position (e.g., driveshaft) may display a limited list of information regarding whether the driveshaft demands removal from a vehicle in which it is positioned prior to determining the second characteristic, e.g., presence of tubing, or whether additional tools are demanded in order to determine the second characteristic. In this way, the limited list decreases time spent by the user in transition between the vehicle in which the driveshaft is positioned and a location of the user device by providing preemptive information of next steps. Additionally, the limited list may also include information specific to the hovered over position such as options for number of yokes, yoke phase, U-joint series and type, etc. In this way, the additional information provided by the limited list may allow the user to determine whether a selection for position is accurate, for if the driveshaft does not match the options provided in the limited list, the user may have selected an inaccurate position. Knowing whether a selection is accurate prior to triggering a subsequent network page decreases time spent in revision and repeating of the process.

The menu 306 may include the plurality of selectable elements 308. Each of the plurality of selectable elements 308 may correspond to one of the options for the first characteristic of the driveshaft. User selection of one of the plurality of selectable elements indicates to the interactive search system the first characteristic of the driveshaft that the options of OEM part numbers may satisfy in order to remain an option for the driveshaft. For example, if the user selection indicates that the position characteristic is driveshaft, all OEM part numbers that include position characteristics of inter axle shaft and/or coupling shaft may be filtered out of the available options. In this way, the first characteristic of the driveshaft may be determined based on user input via the interactive search system, thereby narrowing a set of options for OEM part numbers to a first subset.

In some examples, user selection of one of the plurality of selectable elements 308 may trigger display of a subsequent network page that for determination of the second characteristic, elements displayed in the subsequent network page being narrowed based on the user selection of the first characteristic at the second network page 300. In other examples, a "save" or "next" button may also be included in the second network page 300 that may be selected following user selection of one of the plurality of selectable elements 308. User selection of the "save" or "next" button may trigger display of the subsequent network page.

Figure 4:
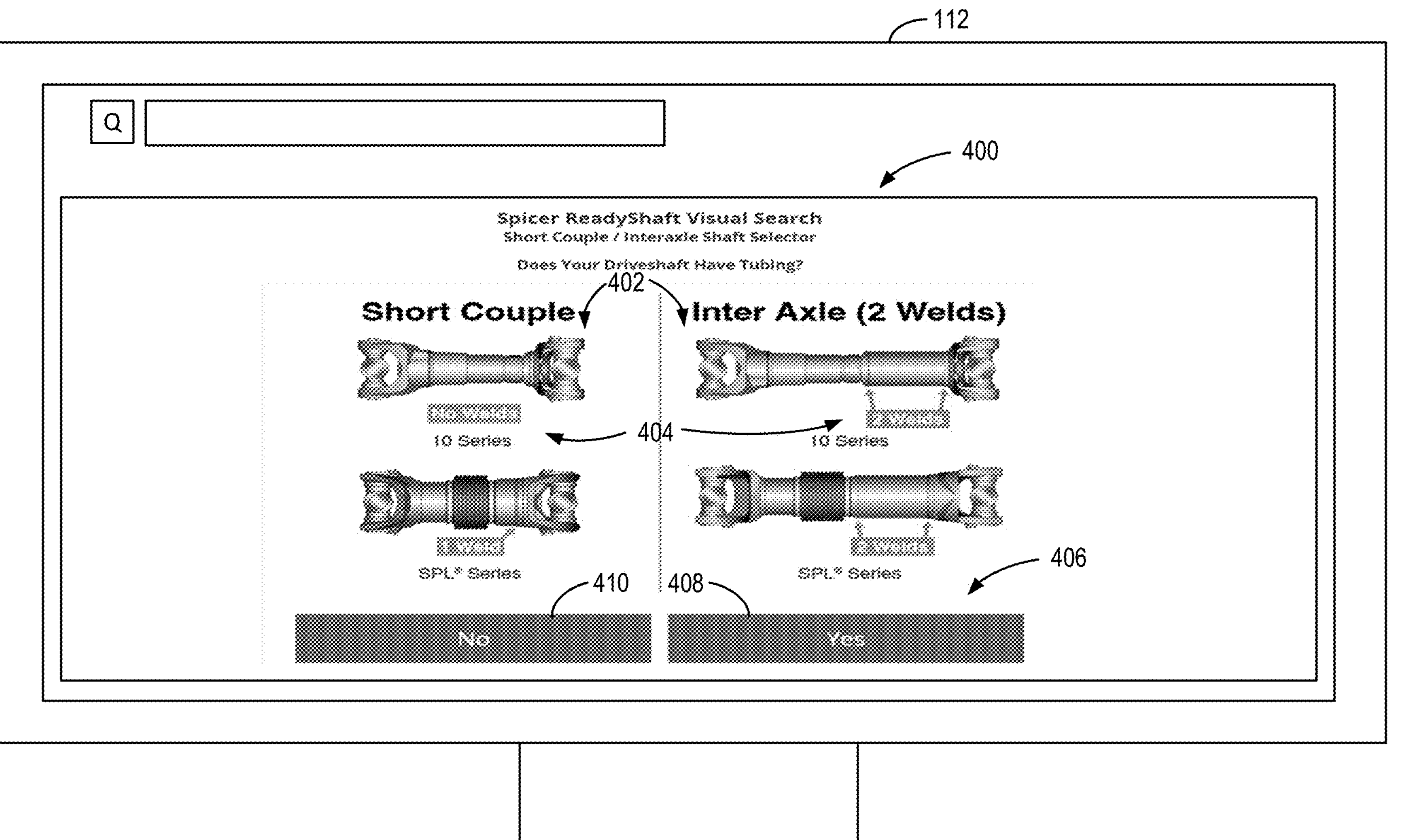
FIG. 4 shows an example of a third network page of the browser.

Turning now to FIG. 4, an example of a third network page 400 is shown. The third network page 400 may be displayed within the same user interface as the second network page 300. The third network page 400 may be displayed by the browser in response to user input to the second network page 300. For example, the third network page 400 may be displayed in response to user selection of one of the plurality of selectable elements 308. The third network page 400 may display a second step in the step-by-step system used to identify the OEM part number of the driveshaft. Thus, the third network page 400 may display contextual information based on inputs to the second network page 300.

In some examples, the second step in the step-by-step system may be to identify the second characteristic, e.g., presence of tubing, of the driveshaft. Determination of presence of tubing in the driveshaft may be based on a plurality of characteristics such as number of welds that differentiates one driveshaft from another. In some examples, a driveshaft without tubing may have no welds and another driveshaft with tubing may have two welds.

The third network page 400 may comprise a plurality of instructional diagrams 402, a plurality of labels 404, a menu 406, a first selectable element 408, and a second selectable element 410. The plurality of instructional diagrams 402 may visually depict to the user various driveshafts, including those with tubing and those without tubing. The plurality of labels 404 may provide additional information regarding each of the displayed driveshafts, such as descriptions of welding and U-joint series identification. In this way, information provided by the interface of the computing system may provide increased accuracy of determination of OEM part number, thereby decreasing errors in ordering and reducing time spent on returns and reorders. In some examples, the labels 404 and/or the instructional diagrams 402 may include selectable elements that when hovered over, modify the third network page 400 to display a pop-up window. The pop-up window may provide additional information regarding one of the options for presence of tubing, including but not limited to information related to a third characteristic for the driveshaft such as U-joint series.

As an example, hovering over a selectable element corresponding to a short couple driveshaft without tubing may display a limited list of information regarding whether the component demands removal from a vehicle in which it is positioned prior to determining the third characteristic, e.g., a U-joint series, or whether additional tools are demanded in order to determine the third characteristic. For example, a measuring ruler may be demanded in order to determine U-joint series for at least some driveshaft types. The pop-up window may in some examples, further include a selectable link to an electronic commerce system that, when selected, launches a commerce network page within the same browser window as the third network page 400 or within a new browser window that is capable of engaging in commerce for the measuring ruler (e.g., the user may purchase the measuring ruler through the commerce network page). In this way, the limited list decreases time spent by the user in transition between the vehicle in which the component is positioned and the location of the user device by providing preemptive information of next steps. Additionally, the limited list may also include information specific to the hovered over driveshaft such as options for number of bearings, yoke phase, presence of a boot, etc. In this way, the additional information provided by the limited list may allow the user to determine whether a selection for presence of tubing is accurate, for if the driveshaft does not match the options provided in the limited list, the user may have selected an inaccurate presence of tubing. Knowing whether a selection is accurate prior to triggering a subsequent network page decreases time spent in revision and repeating of the process.

The menu 406 may include the first selectable element 408 and the second selectable element 410. In some examples, the first selectable element 408 may indicate that the driveshaft does have tubing while the second selectable element 410 indicates that the driveshaft does not have tubing. Selection of one of the selectable elements may indicate to the interactive search system the presence of tubing, thereby filtering options displayed in a subsequent network page. In this way, user selection at one network page sequentially affects and narrows what is displayed in subsequent network pages, providing for a more streamlined and efficient user experience and decreasing time spent sorting through options.

Each of the plurality of selectable elements may correspond to one of the options for the second characteristic of the driveshaft. User selection of one of the plurality of selectable elements 408 indicates to the interactive search system the second characteristic of the driveshaft that the options of OEM part numbers may satisfy in order to remain an option for the driveshaft. For example, if the user selection indicates that tubing is present, all OEM part numbers that do not include tubing may be further filtered out of the available options. In this way, the second characteristic of the driveshaft may be determined based on user input via the interactive search system, thereby narrowing a set of potential part numbers to a second subset.

In some examples, user selection of one of the plurality of selectable elements may trigger display of a subsequent network page that displays a page for determination the third characteristic, options displayed therein further narrowed based on the user selection at the third network page 400. In other examples, a "save" or "next" button may also be included in the third network page 400 that may be selected following user selection of one of the plurality of selectable elements 408. User selection of the "save" or "next" button may trigger display of the subsequent network page.

Figure 5:
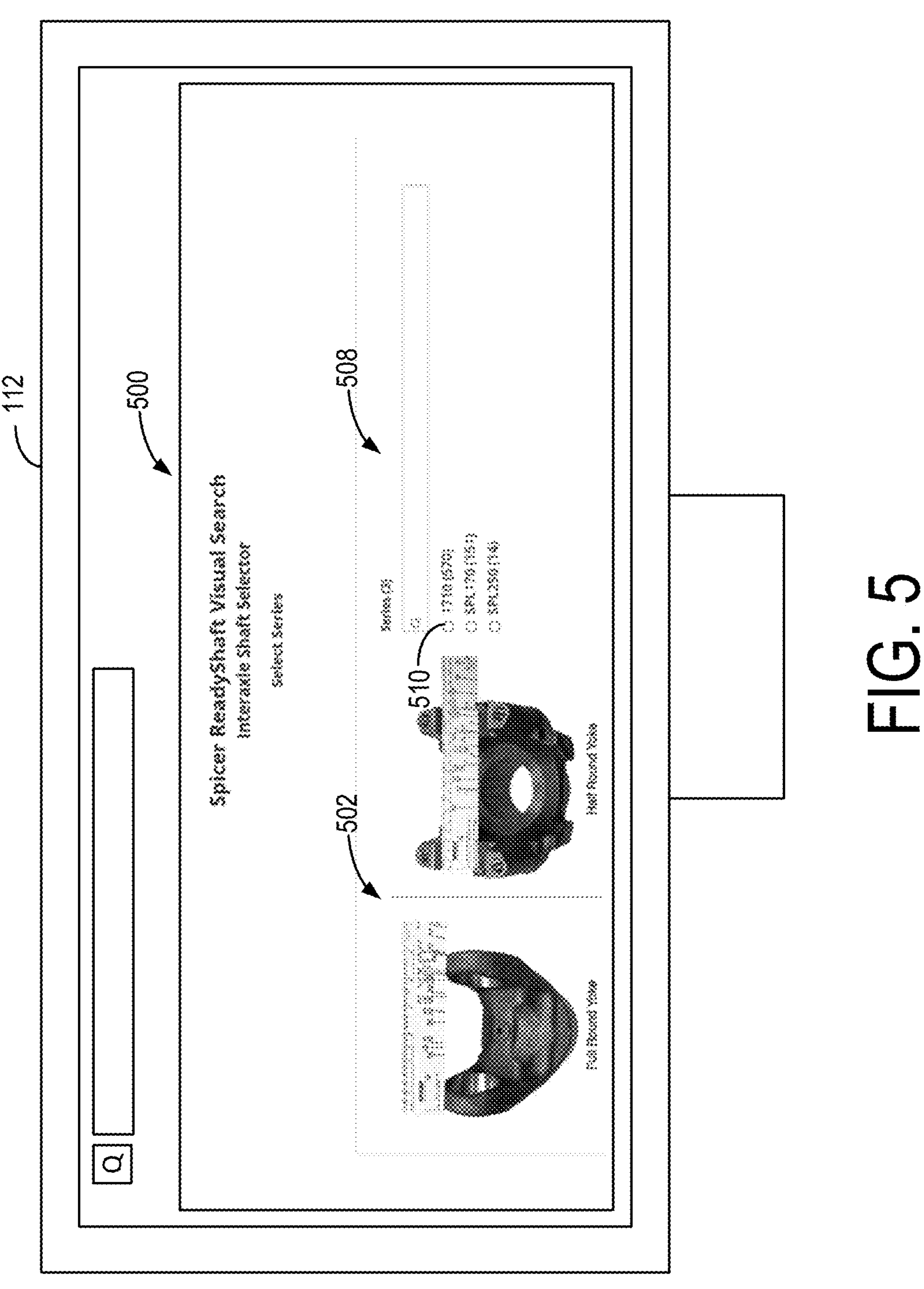
FIG. 5 shows an example of a fourth network page of the browser.

Turning now to FIG. 5, an example of a fourth network page 500 is shown. The fourth network page 500 may be displayed on the same browser interface as the second and third network pages 300, 400. The fourth network page 500 may be displayed by the browser in response to user input to the third network page 400. For example, the fourth network page 500 may be displayed in response to user selection of one of the first selectable element 408 and the second selectable element 410. The fourth network page 500 may display a third step in the step-by-step system used to identify the OEM part number of the driveshaft.

In some examples, the third step in the step-by-step system may be to identify the third characteristic, e.g., U-joint series, of the driveshaft. Determination of U-joint series of the driveshaft may be based on a measurement of a yoke of the driveshaft. In some examples, the driveshaft position selected through the second network page 300 may have one or more possible series for the U-joint. Using a measuring tool, a series for the driveshaft of the one or more possible series may be determined. As an example, a first series may have a first yoke size and a second series may have a second yoke size, the first yoke size differing from the second yoke size.

The fourth network page 500 may comprise a plurality of instructional diagrams 502, a menu 508, and one or more selectable elements 510. The plurality of instructional diagrams 502 may visually depict to the user what a yoke is and a method for employing the measuring tool used to determine U-joint series, including information of what to measure, where to measure, and how to measure. In some examples, the plurality of instructional diagrams 502 may comprise one diagram for each type of yoke, for example a diagram corresponding to a full round yoke and a diagram corresponding to a half round yoke. Measurement technique for different types of yokes may differ and as such each individual instructional diagram may depict measurement technique for a corresponding yoke type. In some examples, an embedded instructional video and/or a selectable link to an e-commerce system for purchase of a yoke ruler may be included in the fourth network page 500 as well. In some examples, the instructional diagrams 402 may include selectable elements that when hovered over, modify the fourth network page 500 to display a pop-up window. The pop-up window may provide additional information regarding one of the options for U-joint series, including but not limited to information related to a fourth characteristic for the driveshaft such as U-joint style.

As an example, hovering over a selectable element within an instructional diagram may display a limited list of information regarding whether the driveshaft demands removal from the vehicle in which it is positioned prior to determining U-joint style (or whether the driveshaft may remain inside the vehicle) and/or whether additional tools are demanded in order to determine the U-joint style. The pop-up window may in some examples, further include a selectable link to the electronic commerce system that launches a commerce network page within the same browser window as the fourth network page 500 or within a new browser window that is capable of engaging in commerce for the yoke ruler (e.g., the user may purchase the conventional ruler through the commerce network page). In this way, the limited list decreases time spent by the user in transition between the vehicle in which the component is positioned and the location of the user device by providing preemptive information of next steps. Additionally, the limited list may also include information specific to the hovered over element such as options for U-joint style. In this way, the additional information provided by the limited list may allow the user to determine whether a selection for U-joint series is accurate, for if the driveshaft does not match the options provided in the limited list, the user may have selected an inaccurate U-joint series. Knowing whether a selection is accurate prior to triggering a subsequent network page decreases time spent in revision and repeating of the process.

The menu 508 may include the plurality of selectable elements 510. In some examples, non-selectable elements may also be included in the menu 508, indicating which elements may be selected and which elements have been filtered out by the interactive search system based on prior user inputs to previous network pages. In other examples, the menu 508 may display only elements that are selectable, omitting elements that are no longer options due to the filtering by the interactive search system. In this way, user selection at one network page sequentially affects and narrows what is displayed in subsequent network pages, providing for a more streamlined and efficient user experience and decreasing time spent sorting through options.

Each of the plurality of selectable elements 510 may correspond to one of the options for the third characteristic of the driveshaft. User selection of one of the plurality of selectable elements 510 indicates to the interactive search system the third characteristic of the driveshaft that the options of OEM part numbers may satisfy in order to remain an option for the driveshaft. For example, if the user selection indicates that the series characteristic is the first series, all OEM part numbers that include series characteristics of the second series, or other series not selected, may be filtered out of the available options. In this way, the third characteristic of the driveshaft may be determined based on user input via the interactive search system, thereby narrowing a set of potential part numbers to a third subset.

In some examples, user selection of one of the plurality of selectable elements 510 may trigger display of a subsequent network page that displays a page for determination a fourth characteristic, options displayed therein further narrowed based on the user selection at the fourth network page 500. In other examples, a "save" or "next" button may also be included in the fourth network page 500 that may be selected following user selection of one of the plurality of selectable elements 510. User selection of the "save" or "next" button may trigger display of the subsequent network page.

Figure 6:
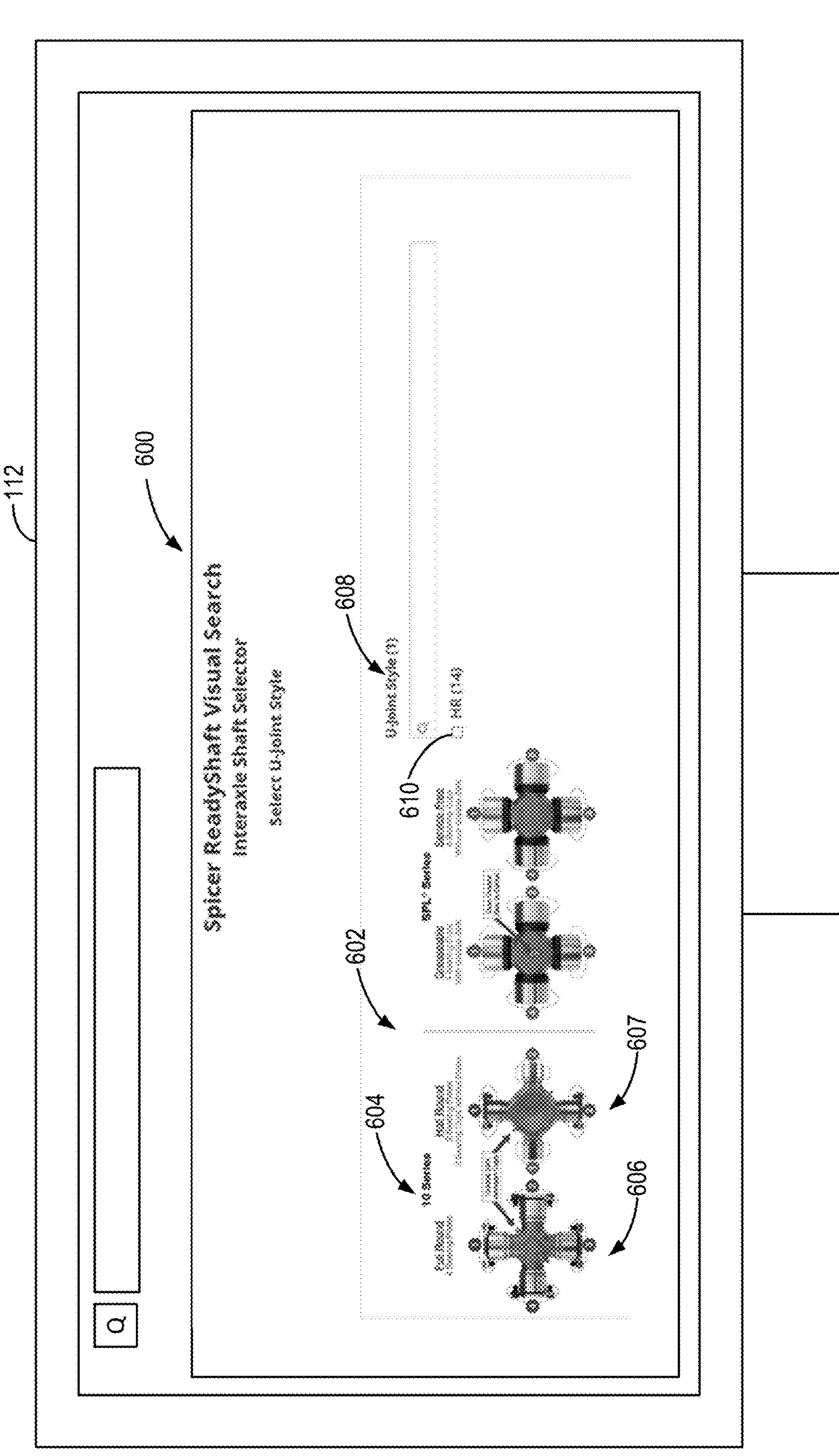
FIG. 6 shows an example of a fifth network page of the browser.

Turning now to FIG. 6, an example of a fifth network page 600 is shown. The fifth network page 600 may be displayed on the same browser interface as the second, third, and fourth network pages 300, 400, 500. The fifth network page 600 may be displayed by the browser in response to user input to the fourth network page 500. For example, the fifth network page 600 may be displayed in response to user selection of one of the plurality of selectable elements 510. The fifth network page 600 may display a fourth step in the step-by-step system used to identify the OEM part number of the driveshaft.

In some examples, the fourth step in the step-by-step system may be to identify the fourth characteristic, e.g., U-joint style, of the driveshaft. In some examples, determination of the length-joint style of the driveshaft may be based on one or more characteristics of the U-joint and/or yoke, including number of bearing plates or cups, types of bearing plates or cups (e.g., bearing plates, bearing cups without plates, and greaseable bearing cups/plates). In some examples, a first U-joint series may have one or more options for U-joint type while another U-joint series may have one or more different options for U-joint type. In other examples, different U-joint series may have overlapping options for U-joint type.

The fifth network page 600 may comprise one or more instructional diagrams 602, such as instructional diagram 604. Each of the one or more instruction diagrams 602 may comprise one or more diagrams of U-joint styles, for example the instructional diagram 604 comprises a first U-joint style diagram 606 and a second U-joint style diagram 607. As a non-limiting example, the first U-joint style may a full round style with four bearing plates and the second U-joint style may be a half round style with two bearing plates and two bearing cups. The fifth network page 600 may further comprise a menu 608, and one or more selectable elements 610. The one or more instructional diagrams 602 may visually depict to the user types and numbers of bearings for a corresponding U-joint style such that the user may directly correlate the driveshaft to one of the diagrams. In some examples, the instructional diagrams 602 may include selectable elements that when hovered over, modify the fifth network page 600 to display a pop-up window. The pop-up window may provide additional information regarding one of the options for installed lengths, including but not limited to information related to a subsequent characteristic for the driveshaft such as tubing length.

As an example, hovering over a selectable element within an instructional picture may display a limited list of information regarding whether the driveshaft demands removal from the vehicle in which it is positioned prior to determining the tubing length (or whether the driveshaft may remain inside the vehicle) and/or whether additional tools are demanded in order to determine the tubing length, including whether to measure the length in millimeters, inches, or other unit.

For example, a conventional ruler may be demanded in order to determine the tubing length. The pop-up window may in some examples, further include a selectable link to the electronic commerce system that launches a commerce network page within the same browser window as the fifth network page 600 or within a new browser window that is capable of engaging in commerce for the conventional ruler (e.g., the user may purchase the conventional ruler through the commerce network page). In this way, the limited list decreases time spent by the user in transition between the vehicle in which the component is positioned and the location of the user device by providing preemptive information of next steps. Additionally, the limited list may also include information specific to the hovered over element such as options for tubing length corresponding to a selected U-joint style. In this way, the additional information provided by the limited list may allow the user to determine whether a selection for U-joint style is accurate, for if the driveshaft does not match the options provided in the limited list, the user may have selected an inaccurate U-joint style. Knowing whether a selection is accurate prior to triggering a subsequent network page decreases time spent in revision and repeating of the process.

The menu 608 may include the plurality of selectable elements 610. In some examples, non-selectable elements may also be included in the menu 608, indicating which elements may be selected and which elements have been filtered out by the interactive search system based on prior user inputs to previous network pages. In other examples, the menu 608 may display only elements that are selectable, omitting elements that are no longer options due to the filtering by the interactive search system. In this way, user selection at one network page sequentially affects and narrows what is displayed in subsequent network pages, providing for a more streamlined and efficient user experience and decreasing time spent sorting through options.

Each of the plurality of selectable elements 610 may correspond to one of the options for the fourth characteristic of the driveshaft. User selection of one of the plurality of selectable elements 610 indicates to the interactive search system the fourth characteristic of the driveshaft that the options of OEM part numbers may satisfy in order to remain an option for the driveshaft. For example, if the user selection indicates that the U-joint style characteristic is a first style, all OEM part numbers that include style characteristics different from the first style may be filtered out of the available options. In this way, the fourth characteristic of the driveshaft may be determined based on user input via the interactive search system, thereby narrowing a set of potential part numbers to a fourth subset.

In some examples, user selection of one of the plurality of selectable elements 610 may trigger display of a subsequent network page that displays a page for determination a fifth characteristic, options displayed therein further narrowed based on the user selection at the fifth network page 600. In other examples, a "save" or "next" button may also be included in the fifth network page 600 that may be selected following user selection of one of the plurality of selectable elements 610. User selection of the "save" or "next" button may trigger display of the subsequent network page.

Figure 7:
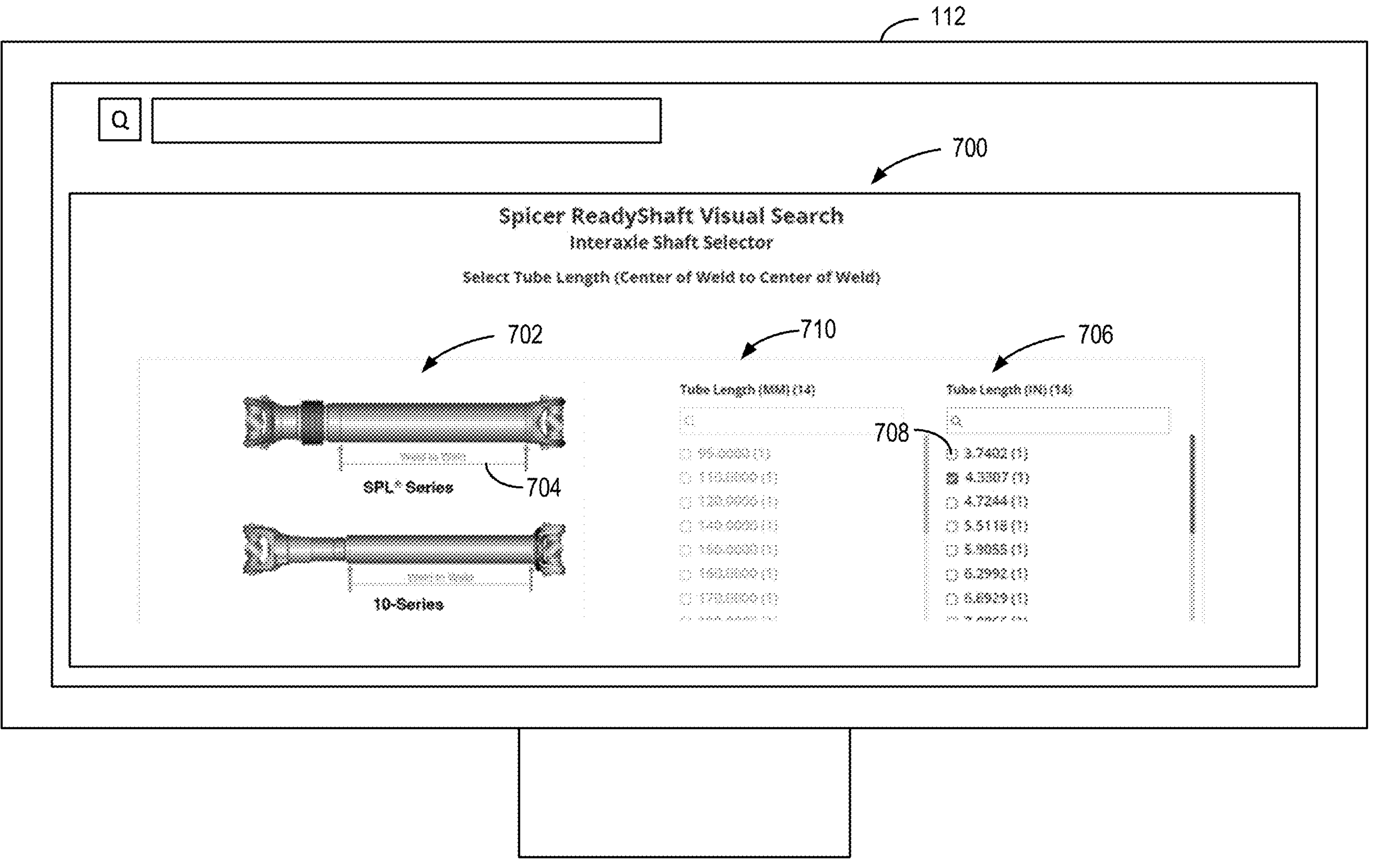
FIG. 7 shows an example of a sixth network page of the browser.

Turning now to FIG. 7, an example of a sixth network page 700 is shown. The sixth network page 700 may be displayed on the same browser interface as the second, third, fourth, and fifth network pages 300, 400, 500, 600. The sixth network page 700 may be displayed by the browser in response to user input to the fifth network page 600. For example, the sixth network page 700 may be displayed in response to user selection of one of the plurality of selectable elements 610. The sixth network page 700 may display a fifth step in the step-by-step system used to identify the OEM part number of the driveshaft.

In some examples, the fifth step in the step-by-step system may be to identify the fifth characteristic, e.g., tubing length, of the driveshaft. In some examples, determination of the tubing length of the driveshaft may be based on a measurement of a tubing of the driveshaft while it is removed from the vehicle. In other examples, the tubing length may be measured with the driveshaft is installed in the vehicle. In some examples, a plurality of tubing lengths are possible for each U-joint style, U-joint series, and driveshaft position. As such, filtering by style, series, and position first may decrease the number of available tubing length options at the fifth step which would otherwise be overly numerous.

The sixth network page 700 may comprise one or more instructional diagrams 702, one or more labels 704, a menu 706, and one or more selectable elements 708. The one or more instructional diagrams 702 may visually depict to the user a method for measuring the tube length of the driveshaft, including information of what to measure, where to measure, and how to measure. In some examples, more than one diagrams may be shown where each diagram corresponds to a particular series. In other examples, only one diagram may be shown, corresponding to a selected series. The one or more labels 704 may indicate borders of where to measure to determine the tube length. In some examples, the sixth network page 700 may also include an embedded instructional video that provides further information to the user regarding such information of how to measure the tube length. In some examples, the instructional diagrams 702 may include selectable elements that when hovered over, modify the sixth network page 700 to display a pop-up window. The pop-up window may provide additional information regarding one of the options for tube lengths, including but not limited to information related to a subsequent characteristic for the driveshaft such as a plurality of slip yoke characteristics available for one or more selected tube lengths.

As an example, hovering over a selectable element within an instructional diagram may display a limited list of information regarding specifics of the plurality of collapsed length measurement types available for one or more of the possible tube lengths. In this way, the additional information provided by the limited list may allow the user to determine whether a determination for tube length is accurate, for if characteristics of collapsed length measurement type of the driveshaft does not match the options provided in the limited list, the user may have selected an inaccurate tube length. Knowing whether a selection is accurate prior to triggering a subsequent network page decreases time spent in revision and repeating of the process.

The menu 706 may include the plurality of selectable elements 708. In some examples, non-selectable elements may also be included in the menu 706 or in a second menu 710, indicating which elements may be selected and which elements have been filtered out by the interactive search system based on prior user inputs to previous network pages. In some examples, the first menu 708 may show a first unit of measurement and the second menu 710 may show a second unit of measurement, wherein one of the menus is non-selectable based on previously selected characteristics. In other examples, only one menu, e.g., the menu 706, may be included to display elements that are selectable, omitting elements that are no longer options due to the filtering by the interactive search system. In this way, user selection at one network page sequentially affects and narrows what is displayed in subsequent network pages, providing for a more streamlined and efficient user experience and decreasing time spent sorting through options.

Each of the plurality of selectable elements 708 may correspond to one of the options for the fifth characteristic of the driveshaft. User selection of one of the plurality of selectable elements 708 indicates to the interactive search system a fifth characteristic of the driveshaft that the options of OEM part numbers may satisfy in order to remain an option for the driveshaft. For example, if the user selection indicates that the tube length characteristic is a first length, all OEM part numbers that include tube length characteristics different from the first length may be filtered out of the available options. In this way, the fifth characteristic of the driveshaft may be determined based on user input via the interactive search system, thereby narrowing a set of potential part numbers to a fifth subset.

In some examples, user selection of one of the plurality of selectable elements 708 may trigger display of a subsequent network page that displays a page for determination a sixth characteristic (or plurality of sixth characteristics), options displayed therein further narrowed based on the user selection at the sixth network page 700. In other examples, a "save" or "next" button may also be included in the sixth network page 700 that may be selected following user selection of one of the plurality of selectable elements 708. User selection of the "save" or "next" button may trigger display of the subsequent network page. It should be understood that if, at the third network page 400, no tubing is selected as the presence of tubing, the sixth network page 700 may be skipped and a seventh network page may be displayed following the fifth network page 600.

Figure 8:
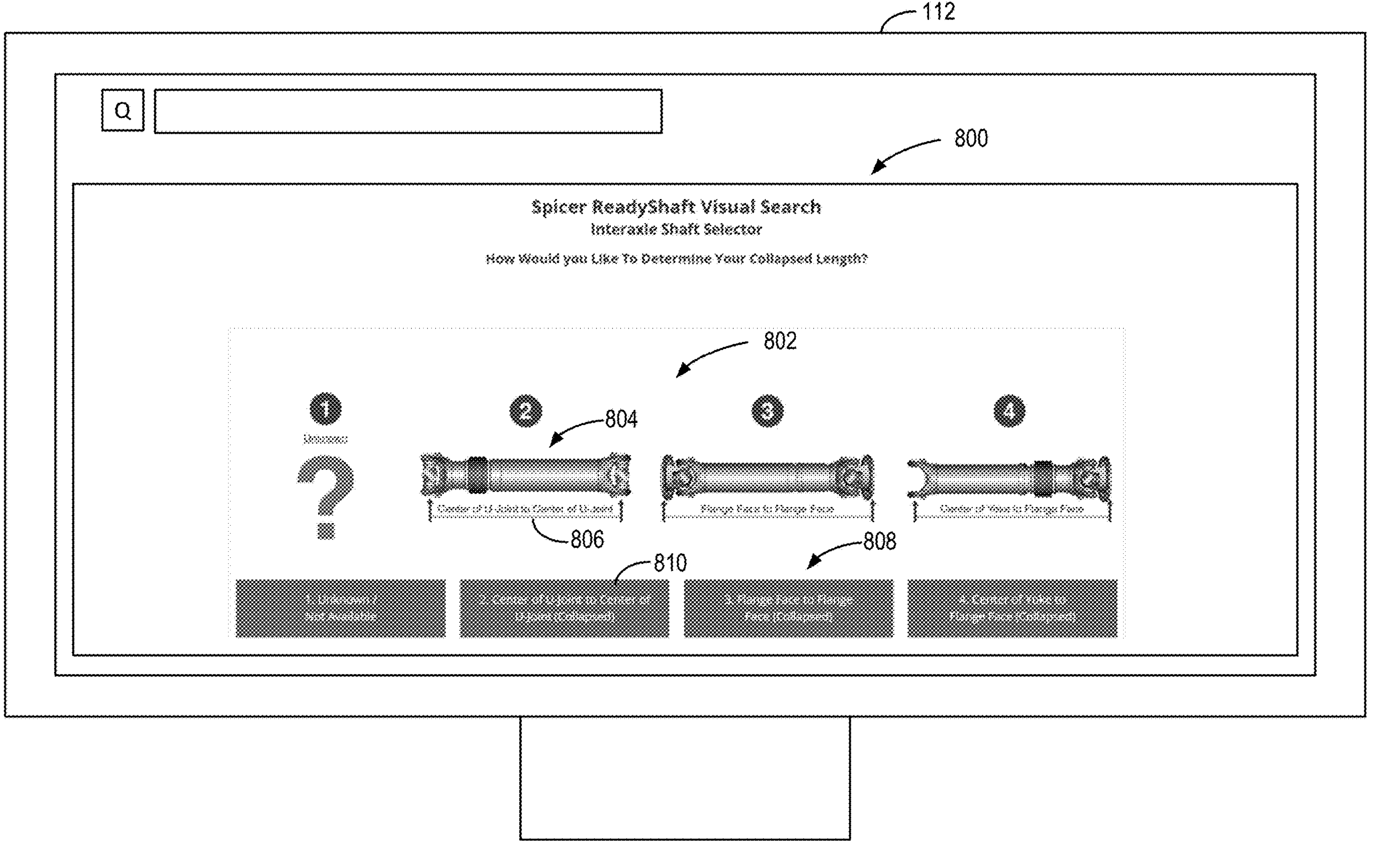
FIG. 8 shows an example of a seventh network page of the browser.

Turning now to FIG. 8, an example of a seventh network page 800 is shown. The seventh network page 800 may be displayed on the same browser interface as the second, third, fourth, fifth, and sixth network pages 300, 400, 500, 600, 700. The seventh network page 800 may be displayed by the browser in response to user input to the sixth network page 700. For example, the seventh network page 800 may be displayed in response to user selection of one of the plurality of selectable elements 708. The seventh network page 800 may display a sixth step in the step-by-step system used to identify the OEM part number of the driveshaft.

In some examples, the sixth step in the step-by-step system may be to identify a measurement type for the sixth characteristic, e.g., collapsed length, of the driveshaft. In some examples, determination of the collapsed length of the driveshaft may be based on one or more measurement types based on the driveshaft. For example, a measurement from center of U-joint to center of U-joint, measurement from flange face to flange face, and measurement from center of yoke to flange face may be options for how to measure collapsed length. In some examples, a plurality of options for measurement of the collapsed length that are possible for the driveshaft may be based the characteristics already known about the driveshaft (e.g., tube length, driveshaft position, etc.).

The seventh network page 800 may comprise one or more instructional diagrams 802, such as first diagram 804, each comprising one or more labels 806, and a menu 808 comprising a plurality of selectable elements 810. The one or more instructional diagrams 802 may visually depict to the user a method for measuring collapsed length of a driveshaft. The one or more labels 806 of each diagram may indicate borders of where to measure for a corresponding measurement type. In some examples, the seventh network page 800 may also include an embedded instructional video that provides further information to the user regarding such information of how to measure the aforementioned lengths. In some examples, the instructional diagrams 802 may include selectable elements that when hovered over, modify the seventh network page 800 to display a pop-up window. The pop-up window may provide additional information regarding a collapsed length, including potential corresponding installed lengths, yoke characteristics, or the like.

In some examples, the menu 808 may include the first plurality of selectable elements 810. Each of the selectable elements may correspond to one of the measurement types depicted in one of the diagrams. In some examples, the displayed diagrams and measurement types may be based on previously selected characteristics. In this way, user selection at one network page sequentially affects and narrows what is displayed in subsequent network pages, providing for a more streamlined and efficient user experience and decreasing time spent sorting through options.

In some examples, user selection of one the selectable elements 810 may trigger display of a subsequent network page. In other examples, a "save" or "next" button may also be included in the seventh network page 800 that may be selected following user selection of one of the plurality of selectable elements 810. User selection of the "save" or "next" button may trigger display of the subsequent network page. In some examples, the subsequent network page may be a seventh network page for determining the sixth characteristic.

Figure 9:
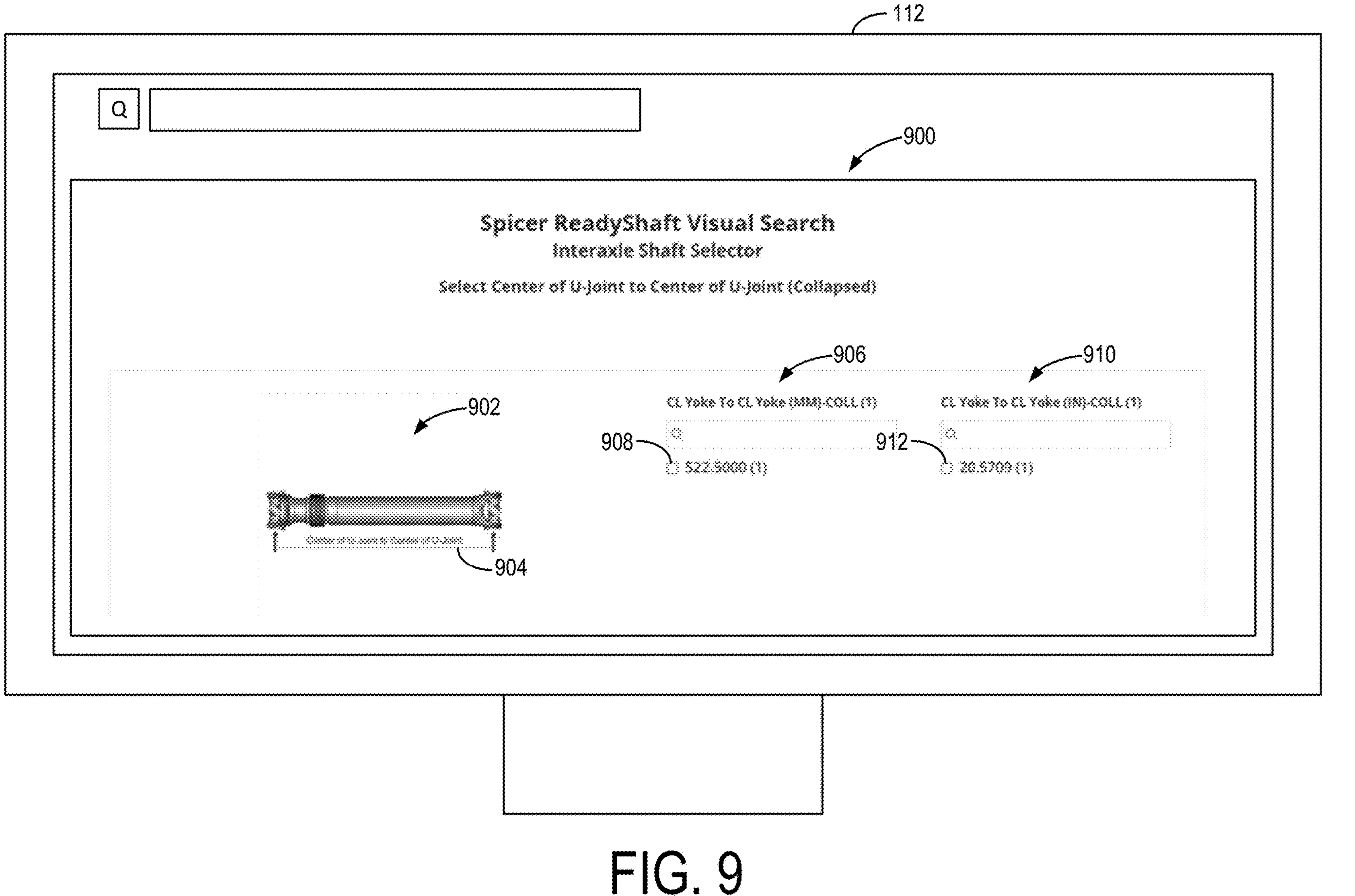
FIG. 9 shows an example of an eighth network page of the browser.

Turning to FIG. 9, an example of an eighth network page 900 is shown. The eighth network page 900 may be displayed on the same browser interface as the second, third, fourth, fifth, sixth, and seventh network pages 300, 400, 500, 600, 700, 800. The eighth network page 900 may be displayed by the browser in response to user input to the seventh network page 800. For example, the eighth network page 900 may be displayed in response to user selection of one of the plurality of selectable elements 810. The eighth network page 900 may display a seventh step in the step-by-step system used to identify the OEM part number of the driveshaft.

In some examples, the seventh step in the step-by-step system may be to identify the sixth characteristic, e.g., collapsed length, of the driveshaft. In some examples, determination of the collapsed length of the driveshaft may be based on a measurement of the driveshaft while it is removed from the vehicle. Various ways to measure the collapsed length are possible, one of which is selected at the seventh network page 800. As such, the displayed diagrams and options in the eighth network page 900 may correspond to the selected measurement type. In some examples, a plurality of collapsed lengths are possible for each tubing length, U-joint style, U-joint series, and driveshaft position. As such, filtering by tube length, style, series, and position first may decrease the number of available collapsed length options at the seventh step which would otherwise be overly numerous.

The eighth network page 900 may comprise one or more instructional diagrams 902, one or more labels 904, a first menu 906, one or more first selectable elements 908, a second menu 910, and one or more second selectable elements 912. The one or more instructional diagrams 902 may visually depict to the user a method for measuring the collapsed length of the driveshaft based on the selected measurement manner from the seventh network page 800, including information of what to measure, where to measure, and how to measure. The one or more labels 904 may indicate borders of where to measure to determine the collapsed length. In some examples, the eighth network page 900 may also include an embedded instructional video that provides further information to the user regarding such information of how to measure the tube length. In some examples, the instructional diagrams 902 may include selectable elements that when hovered over, modify the eighth network page 900 to display a pop-up window. The pop-up window may provide additional information regarding one of the options for collapsed lengths, including but not limited to information related to a subsequent characteristic for the driveshaft such as installed lengths and yoke characteristics available for one or more selected collapsed lengths.

As an example, hovering over a selectable element within an instructional diagram may display a limited list of information regarding specifics of installed lengths available for one or more of the possible collapsed lengths. In this way, the additional information provided by the limited list may allow the user to determine whether a determination of collapsed length is accurate, for if characteristics of installed of the driveshaft do not match the options provided in the limited list, the user may have selected an inaccurate collapsed length. Knowing whether a selection is accurate prior to triggering a subsequent network page decreases time spent in revision and repeating of the process.

The first menu 906 may include the plurality of first selectable elements 908 and the second menu 910 may include the plurality of second selectable elements 912. In some examples, non-selectable elements may also be included in the first and/or second menus 906, 910, indicating which elements may be selected and which elements have been filtered out by the interactive search system based on prior user inputs to previous network pages. In some examples, the first menu 906 may show a first unit of measurement and the second menu 910 may show a second unit of measurement, wherein one of the menus or selectable elements within one or more of the menus are non-selectable based on previously selected characteristics. In this way, user selection at one network page sequentially affects and narrows what is displayed in subsequent network pages, providing for a more streamlined and efficient user experience and decreasing time spent sorting through options.

Each of the plurality of selectable elements 908, 912 may correspond to one of the options for the sixth characteristic of the driveshaft. User selection of one of the plurality of selectable elements 908, 912 indicates to the interactive search system the sixth characteristic of the driveshaft that the options of OEM part numbers may satisfy in order to remain an option for the driveshaft. For example, if the user selection indicates that the collapsed length characteristic is a first length, all OEM part numbers that include collapsed length characteristics different from the first length may be filtered out of the available options. In this way, the sixth characteristic of the driveshaft may be determined based on user input via the interactive search system, thereby further narrowing a set of potential part numbers to a sixth subset.

In some examples, user selection of one of the plurality of first selectable elements 908 or one of the plurality of second selectable elements 912 may trigger display of a subsequent network page that displays a page for determination of a measurement method for a seventh characteristic, options displayed therein further narrowed based on the user selection at the eighth network page 900. In other examples, a "save" or "next" button may also be included in the eighth network page 900 that may be selected following user selection of one of the plurality of selectable elements 908, 912. User selection of the "save" or "next" button may trigger display of the subsequent network page.

Turning now to FIG. 10, an example of a ninth network page 1000 is shown. The ninth network page 1000 may be displayed on the same browser interface as the second, third, fourth, fifth, sixth, seventh, and eighth network pages 300, 400, 500, 600, 700, 800, 900. The ninth network page 1000 may be displayed by the browser in response to user input to the eighth network page 900. For example, the ninth network page 1000 may be displayed in response to user selection of one of the plurality of selectable elements 908, 912. The ninth network page 1000 may display an eighth step in the step-by-step system used to identify the OEM part number of the driveshaft.

In some examples, the eighth step in the step-by-step system may be to identify a measurement type for the seventh characteristic, e.g., installed length, of the driveshaft. In some examples, determination of the installed length of the driveshaft may be based on one or more measurement methods of the driveshaft. For example, a measurement from center of U-joint to center of U-joint, measurement from flange face to flange face, and measurement from center of yoke to flange face may be options for how to measure installed length. In some examples, a plurality of options for measurement of the installed length that are possible for the driveshaft may be based the characteristics already known about the driveshaft (e.g., tube length, driveshaft position, collapsed length, etc.).

The ninth network page 1000 may comprise one or more instructional diagrams 1002, such as first diagram 1004, each comprising one or more labels 1006, and a menu 808 comprising a plurality of selectable elements 1010. The one or more instructional diagrams 1002 may visually depict to the user a method for measuring installed length of a driveshaft. The one or more labels 1006 of each diagram may indicate borders of where to measure for a corresponding measurement type. In some examples, the ninth network page 1000 may also include an embedded instructional video that provides further information to the user regarding such information of how to measure the aforementioned lengths. In some examples, the instructional diagrams 1002 may include selectable elements that when hovered over, modify the ninth network page 1000 to display a pop-up window. The pop-up window may provide additional information regarding one or more of the measurement methods.

In some examples, the menu 1008 may include the first plurality of selectable elements 1010. Each of the selectable elements may correspond to one of the measurement types depicted in one of the diagrams. In some examples, the displayed diagrams and measurement types may be based on previously selected characteristics. In this way, user selection at one network page sequentially affects and narrows what is displayed in subsequent network pages, providing for a more streamlined and efficient user experience and decreasing time spent sorting through options.

In some examples, user selection of one the selectable elements 1010 may trigger display of a subsequent network page. In other examples, a "save" or "next" button may also be included in the ninth network page 1000 that may be selected following user selection of one of the plurality of selectable elements 1010. User selection of the "save" or "next" button may trigger display of the subsequent network page. In some examples, the subsequent network page may be a tenth network page for determining the seventh characteristic.

Turning to FIG. 11, an example of a tenth network page 1100 is shown. The tenth network page 1100 may be displayed on the same browser interface as the second, third, fourth, fifth, sixth, seventh, eighth, and ninth network pages 300, 400, 500, 600, 700, 800, 900, and 1000. The tenth network page 1100 may be displayed by the browser in response to user input to the ninth network page 1000. For example, the tenth network page 1100 may be displayed in response to user selection of one of the plurality of selectable elements 1010. The tenth network page 1100 may display a ninth step in the step-by-step system used to identify the OEM part number of the driveshaft.

In some examples, the ninth step in the step-by-step system may be to identify the seventh characteristic, e.g., installed length, of the driveshaft. In some examples, determination of the installed length of the driveshaft may be based on a measurement of the driveshaft while it is installed in the vehicle. Various ways to measure the installed length are possible, one of which is selected at the ninth network page 1000. As such, the displayed diagrams and options in the tenth network page 1100 may correspond to the selected measurement method. In some examples, a plurality of installed lengths are possible for each collapsed length, tubing length, U-joint style, U-joint series, and driveshaft position. As such, filtering by collapsed length, tube length, style, series, and position first may decrease the number of available installed length options at the eighth step which would otherwise be overly numerous.

The tenth network page 1100 may comprise one or more instructional diagrams 1102, one or more labels 1104, a first menu 1106, one or more first selectable elements 1108, a second menu 1110, and one or more second selectable elements 1112. The one or more instructional diagrams 1102 may visually depict to the user a method for measuring the installed length of the driveshaft based on the selected measurement method from the ninth network page 1000, including information of what to measure, where to measure, and how to measure. The one or more labels 1104 may indicate borders of where to measure to determine the installed length. In some examples, the tenth network page 1100 may also include an embedded instructional video that provides further information to the user regarding such information of how to measure the tube length. In some examples, the instructional diagrams 1102 may include selectable elements that when hovered over, modify the tenth network page 1100 to display a pop-up window. The pop-up window may provide additional information regarding one of the options for installed lengths, including but not limited to information related to a subsequent characteristic for the driveshaft such as tubing diameter and yoke characteristics available for one or more selected installed lengths.

As an example, hovering over a selectable element within an instructional diagram may display a limited list of information regarding specifics of tubing diameters available for one or more of the possible installed lengths. In this way, the additional information provided by the limited list may allow the user to determine whether a determination of installed length is accurate, for if characteristics of tubing diameter of the driveshaft do not match the options provided in the limited list, the user may have selected an inaccurate installed length. Knowing whether a selection is accurate prior to triggering a subsequent network page decreases time spent in revision and repeating of the process.

The first menu 1106 may include the plurality of first selectable elements 1108 and the second menu 1110 may include the plurality of second selectable elements 1112. In some examples, non-selectable elements may also be included in the first and/or second menus 1106, 1110, indicating which elements may be selected and which elements have been filtered out by the interactive search system based on prior user inputs to previous network pages. In some examples, the first menu 1106 may show a first unit of measurement and the second menu 1110 may show a second unit of measurement, wherein one of the menus or selectable elements within one or more of the menus are non-selectable based on previously selected characteristics. In this way, user selection at one network page sequentially affects and narrows what is displayed in subsequent network pages, providing for a more streamlined and efficient user experience and decreasing time spent sorting through options.

Each of the plurality of selectable elements 1108, 1112 may correspond to one of the options for the seventh characteristic of the driveshaft. User selection of one of the plurality of selectable elements 1108, 1112 indicates to the interactive search system the seventh characteristic of the driveshaft that the options of OEM part numbers may satisfy in order to remain an option for the driveshaft. For example, if the user selection indicates that the installed length characteristic is a first length, all OEM part numbers that include installed length characteristics different from the first length may be filtered out of the available options. In this way, the seventh characteristic of the driveshaft may be determined based on user input via the interactive search system, thereby further narrowing a set of potential part numbers to a seventh subset.

In some examples, user selection of one of the plurality of first selectable elements 1108 or one of the plurality of second selectable elements 1112 may trigger display of a subsequent network page that displays a page for determination of an eighth characteristic, options displayed therein further narrowed based on the user selection at the tenth network page 1100. In other examples, a "save" or "next" button may also be included in the tenth network page 1100 that may be selected following user selection of one of the plurality of selectable elements 1108, 1112. User selection of the "save" or "next" button may trigger display of the subsequent network page.

Figure 12:
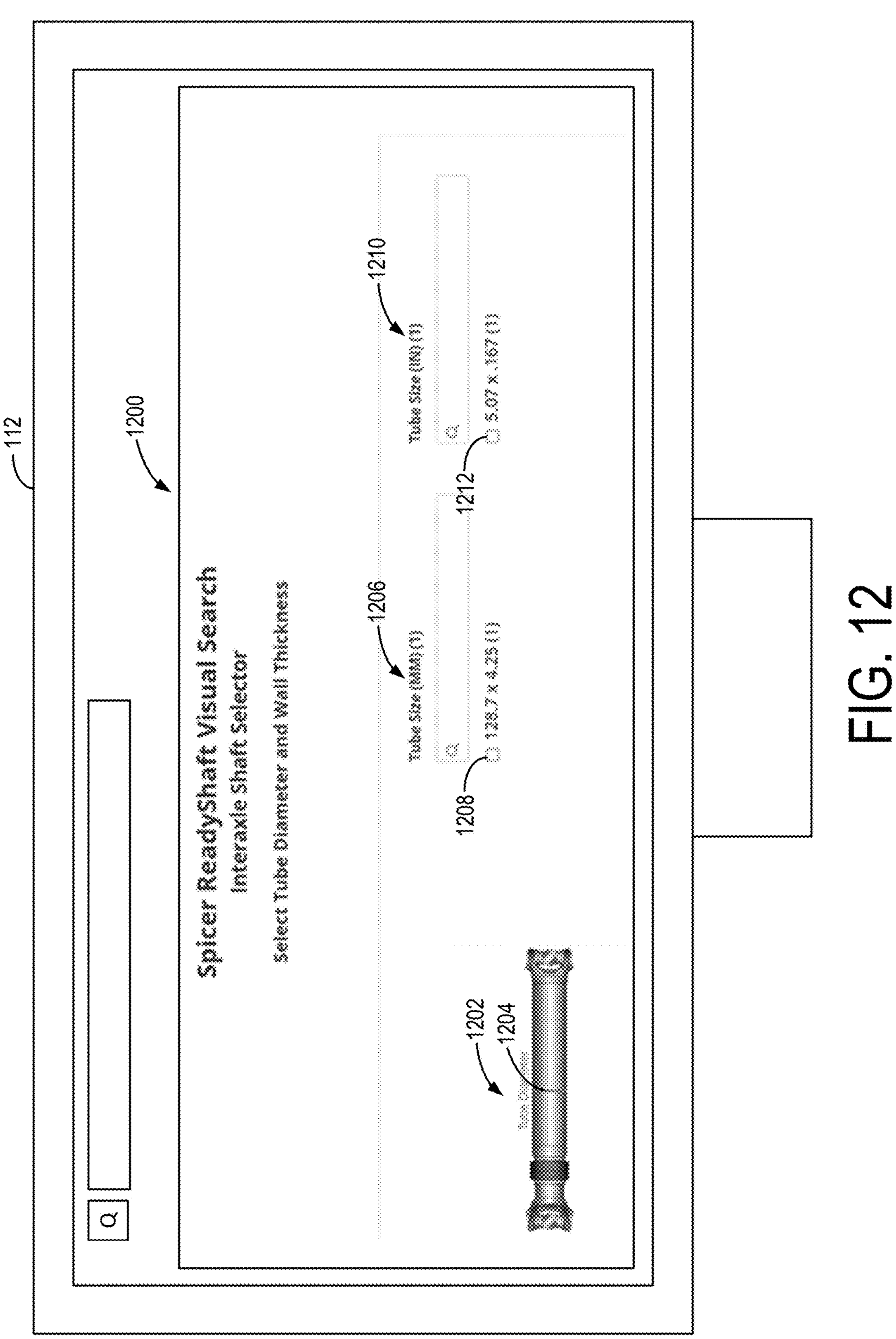
FIG. 12 shows an example of an eleventh network page of the browser.

Turning to FIG. 12, an example of an eleventh network page 1200 is shown. The eleventh network page 1200 may be displayed on the same browser interface as the second, third, fourth, fifth, sixth, seventh, eighth, ninth, and tenth network pages 300, 400, 500, 600, 700, 800, 900, 1000, and 1100. The eleventh network page 1200 may be displayed by the browser in response to user input to the tenth network page 1100. For example, the eleventh network page 1200 may be displayed in response to user selection of one of the plurality of selectable elements 1108, 1112. The eleventh network page 1200 may display a tenth step in the step-by-step system used to identify the OEM part number of the driveshaft.

In some examples, the tenth step in the step-by-step system may be to identify the eighth characteristic, e.g., tubing diameter, of the driveshaft. In some examples, determination of the tubing diameter of the driveshaft may be based on a measurement of the driveshaft while it is installed in the vehicle and in other examples when the driveshaft is removed from the vehicle. In some examples, a plurality of installed lengths are possible for each collapsed length, tubing length, U-joint style, U-joint series, and driveshaft position. As such, filtering by collapsed length, tube length, style, series, and position first may decrease the number of available installed length options at the eighth step which would otherwise be overly numerous.

The eleventh network page 1200 may comprise one or more instructional diagrams 1202, one or more labels 1204, a first menu 1206, one or more first selectable elements 1208, a second menu 1210, and one or more second selectable elements 1212. The one or more instructional diagrams 1202 may visually depict to the user a method for measuring the tubing diameter of the driveshaft, including information of what to measure, where to measure, and how to measure. The one or more labels 1204 may indicate borders of where to measure to determine the tubing diameter. In some examples, the eleventh network page 1200 may also include an embedded instructional video that provides further information to the user regarding such information of how to measure the tube diameter. In some examples, the instructional diagrams 1202 may include selectable elements that when hovered over, modify the eleventh network page 1200 to display a pop-up window. The pop-up window may provide additional information regarding one of the options for tubing diameter, including but not limited to information related to a subsequent characteristic for the driveshaft such as yoke phase available for one or more selected tubing diameters.

As an example, hovering over a selectable element within an instructional diagram may display a limited list of information regarding specifics of yoke phases available for one or more of the possible tubing diameters. In this way, the additional information provided by the limited list may allow the user to determine whether a determination of tubing diameter is accurate, for if characteristics of yoke phase of the driveshaft do not match the options provided in the limited list, the user may have selected an inaccurate tubing diameter. Knowing whether a selection is accurate prior to triggering a subsequent network page decreases time spent in revision and repeating of the process.

The first menu 1206 may include the plurality of first selectable elements 1208 and the second menu 1210 may include the plurality of second selectable elements 1212. In some examples, non-selectable elements may also be included in the first and/or second menus 1206, 1210, indicating which elements may be selected and which elements have been filtered out by the interactive search system based on prior user inputs to previous network pages. In some examples, the first menu 1206 may show a first unit of measurement and the second menu 1210 may show a second unit of measurement, wherein one of the menus or selectable elements within one or more of the menus are non-selectable based on previously selected characteristics. In this way, user selection at one network page sequentially affects and narrows what is displayed in subsequent network pages, providing for a more streamlined and efficient user experience and decreasing time spent sorting through options.

Each of the plurality of selectable elements 1208, 1212 may correspond to one of the options for the eighth characteristic of the driveshaft. User selection of one of the plurality of selectable elements 1208, 1212 indicates to the interactive search system the eighth characteristic of the driveshaft that the options of OEM part numbers may satisfy in order to remain an option for the driveshaft. For example, if the user selection indicates that the tubing diameter characteristic is a first diameter, all OEM part numbers that include tubing diameter characteristics different from the first diameter may be filtered out of the available options. In this way, the eighth characteristic of the driveshaft may be determined based on user input via the interactive search system, thereby further narrowing a set of potential part numbers to an eighth subset.

In some examples, user selection of one of the plurality of first selectable elements 1208 or one of the plurality of second selectable elements 1212 may trigger display of a subsequent network page that displays a page for determination of a ninth characteristic, options displayed therein further narrowed based on the user selection at the eleventh network page 1200. In other examples, a “save” or “next” button may also be included in the eleventh network page 1200 that may be selected following user selection of one of the plurality of selectable elements 1208, 1212. User selection of the “save” or “next” button may trigger display of the subsequent network page.

Figure 13:
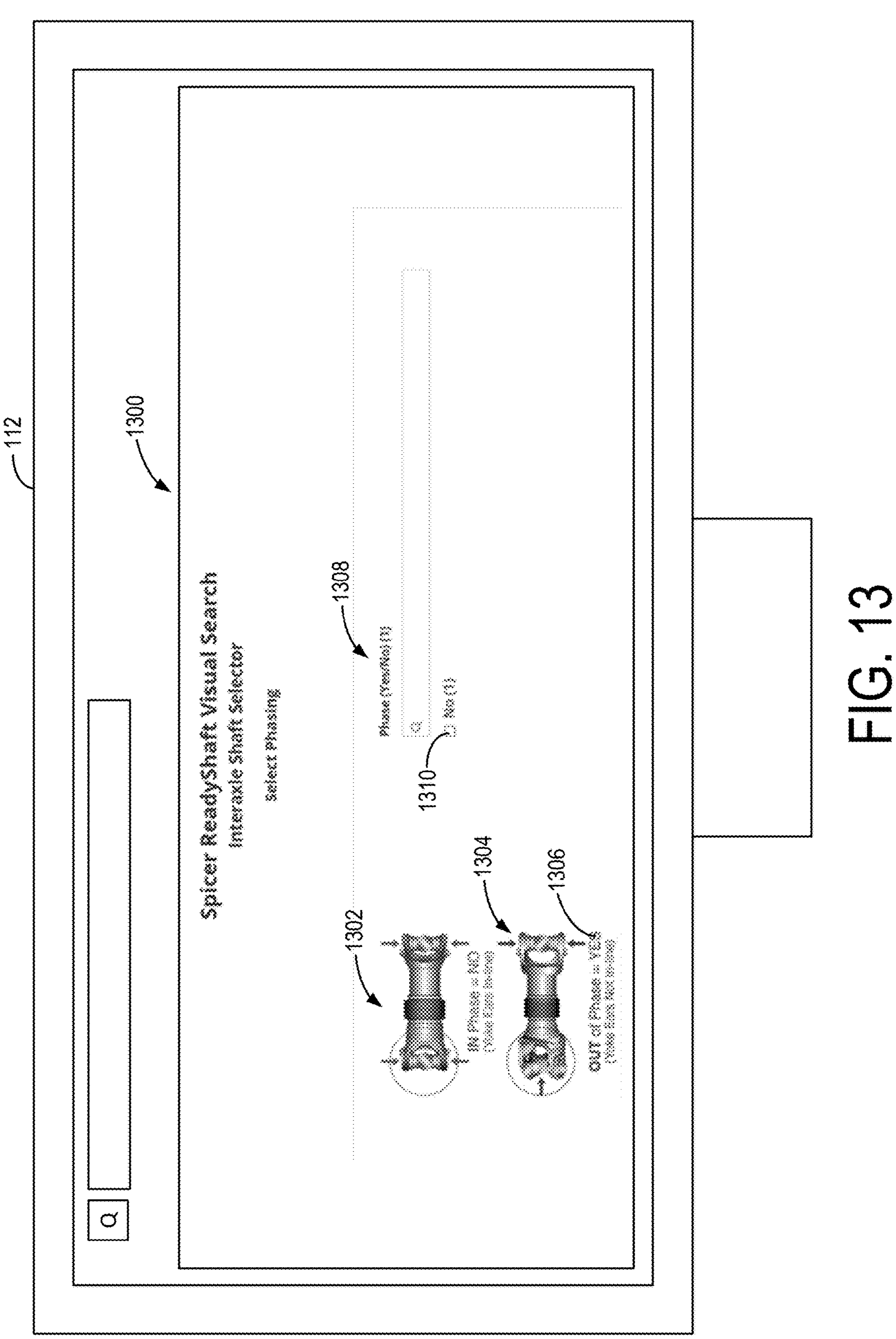
FIG. 13 shows an example of a twelfth network page of the browser.

Turning to FIG. 13, an example of an twelfth network page 1300 is shown. The twelfth network page 1300 may be displayed on the same browser interface as the second, third, fourth, fifth, sixth, seventh, eighth, ninth, tenth, and eleventh network pages 300, 400, 500, 600, 700, 800, 900, 1000, 1100, and 1200. The twelfth network page 1300 may be displayed by the browser in response to user input to the eleventh network page 1200. For example, the twelfth network page 1300 may be displayed in response to user selection of one of the plurality of selectable elements 1208, 1212. The twelfth network page 1300 may display an eleventh step in the step-by-step system used to identify the OEM part number of the driveshaft.

In some examples, the eleventh step in the step-by-step system may be to identify the ninth characteristic, e.g., yoke phase, of the driveshaft. In some examples, determination of the yoke phase of the driveshaft may be performed for the driveshaft while it is removed from the vehicle. In some examples, a plurality of yoke phases are possible for each installed and collapsed length, tubing length, U-joint style, U-joint series, and driveshaft position. For example, the driveshaft may have a yoke that is in phase or a yoke that is out of phase. Determination of in phase vs out of phase may be based on whether the yoke ears are in line with the shaft. As such, filtering by installed and collapsed length, tube length, style, series, and position first may decrease the number of available yoke phase options at the eleventh step.

The twelfth network page 1300 may comprise one or more instructional diagrams 1302, such as diagram 1304 which each include one or more labels 1306, a menu 1308, and one or more selectable elements 1310. The one or more instructional diagrams 1302 may visually depict to the user a yoke that is in phase and a yoke that is out of phase, including information of meaning of in phase vs out of phase in the one or more labels 1306. In some examples, the twelfth network page 1300 may also include an embedded instructional video that provides further information to the user regarding such information of how to determine yoke phase. In some examples, the instructional diagrams 1302 may include selectable elements that when hovered over, modify the twelfth network page 1300 to display a pop-up window. The pop-up window may provide additional information regarding one of the options for yoke phase, including but not limited to information related to a subsequent characteristic for the driveshaft such as yoke angle available for one or more selected yoke phases.

As an example, hovering over a selectable element within an instructional diagram may display a limited list of information regarding specifics of yoke angles available for one or more of the possible yoke phases. In this way, the additional information provided by the limited list may allow the user to determine whether a determination of yoke phase is accurate, for if characteristics of yoke angle of the driveshaft do not match the options provided in the limited list, the user may have selected an inaccurate yoke phase. Knowing whether a selection is accurate prior to triggering a subsequent network page decreases time spent in revision and repeating of the process.

The menu 1308 may include the plurality of selectable elements 1310. In some examples, non-selectable elements may also be included in the menu 1308, indicating which elements may be selected and which elements have been filtered out by the interactive search system based on prior user inputs to previous network pages. In other examples, options that have been filtered out may be omitted from the menu 1308. In this way, user selection at one network page sequentially affects and narrows what is displayed in subsequent network pages, providing for a more streamlined and efficient user experience and decreasing time spent sorting through options.

Each of the plurality of selectable elements 1310 may correspond to one of the options for the ninth characteristic of the driveshaft. User selection of one of the plurality of selectable elements 1310 indicates to the interactive search system the ninth characteristic of the driveshaft that the options of OEM part numbers may satisfy in order to remain an option for the driveshaft. For example, if the user selection indicates that the yoke is out of phase, all OEM part numbers that include yokes that are in phase may be filtered out of the available options. In this way, the ninth characteristic of the driveshaft may be determined based on user input via the interactive search system, thereby further narrowing a set of potential part numbers to a ninth subset.

In some examples, user selection of one of the plurality of selectable elements 1310 may trigger display of a subsequent network page that displays a page for determination of a tenth characteristic, options displayed therein further narrowed based on the user selection at the twelfth network page 1300. In other examples, a "save" or "next" button may also be included in the twelfth network page 1300 that may be selected following user selection of one of the plurality of selectable elements 1310. User selection of the "save" or "next" button may trigger display of the subsequent network page.

Figure 14:
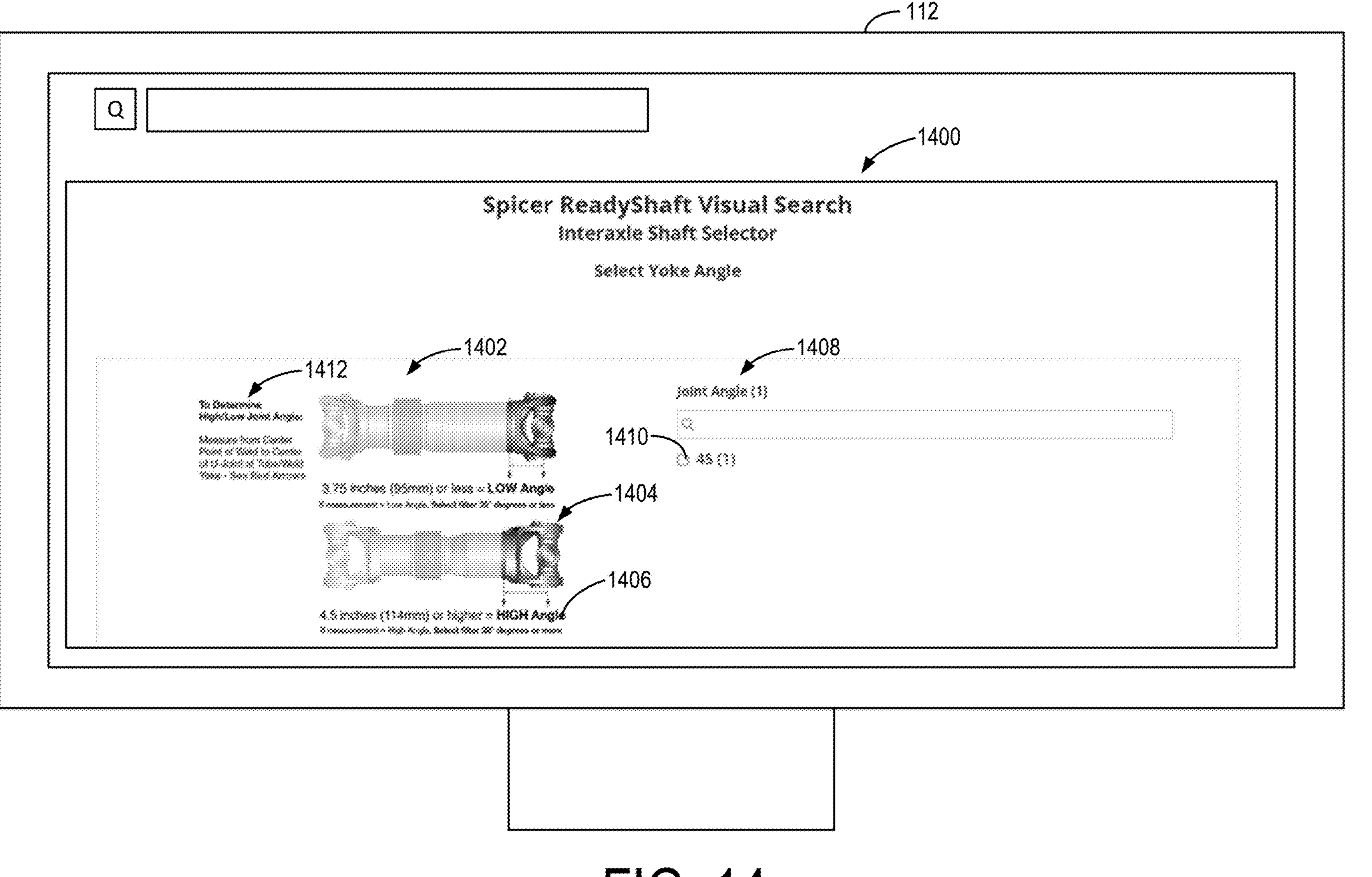
FIG. 14 shows an example of a thirteenth network page of the browser.

Turning to FIG. 14, an example of a thirteenth network page 1400 is shown. The thirteenth network page 1400 may be displayed on the same browser interface as the second, third, fourth, fifth, sixth, seventh, eighth, ninth, tenth, eleventh, and twelfth network pages 300, 400, 500, 600, 700, 800, 900, 1000, 1100, 1200, and 1300. The thirteenth network page 1400 may be displayed by the browser in response to user input to the twelfth network page 1300. For example, the thirteenth network page 1400 may be displayed in response to user selection of one of the plurality of selectable elements 1310. The thirteenth network page 1400 may display an twelfth, and in some examples final, step in the step-by-step system used to identify the OEM part number of the driveshaft.

In some examples, the twelfth step in the step-by-step system may be to identify the tenth characteristic, e.g., yoke angle, of the driveshaft. In some examples, determination of the yoke angle of the driveshaft may be performed for the driveshaft while it is removed from the vehicle. In some examples, a plurality of yoke angles are possible for each yoke phase, installed and collapsed lengths, tubing length, U-joint style, U-joint series, and driveshaft position. For example, the driveshaft may have a yoke that at a low angle or a yoke that at a high angle. Determination of angle may be based on a measurement from a center point of a weld to a center of the U-joint at tube/weld yoke. As such, filtering by yoke phase, installed and collapsed length, tube length, style, series, and position first may decrease the number of available yoke phase options at the twelfth step.

The thirteenth network page 1400 may comprise one or more instructional diagrams 1402, such as diagram 1404, which each include one or more labels 1406, a menu 1408, and one or more selectable elements 1410. The one or more instructional diagrams 1402 may visually depict to the user yokes of various angles, such as a high angle yoke and a low angle yoke, including information of various angles in the one or more labels 1406. In some examples, the thirteenth network page 1400 may also include informational text 1412 about how to measure yoke angle. In some examples, the thirteenth network page 1400 may also include an embedded instructional video that provides further information to the user regarding such information of how to determine yoke angle. In some examples, the instructional diagrams 1402 may include selectable elements that when hovered over, modify the thirteenth network page 1400 to display a pop-up window. The pop-up window may provide additional information regarding one of the options for yoke angle, including but not limited to information related to a subsequent characteristic for the driveshaft, if a subsequent characteristic is available, or information of a determined OEM part number.

The menu 1408 may include the plurality of selectable elements 1410. In some examples, non-selectable elements may also be included in the menu 1408, indicating which elements may be selected and which elements have been filtered out by the interactive search system based on prior user inputs to previous network pages. In other examples, options that have been filtered out may be omitted from the menu 1408. In this way, user selection at one network page sequentially affects and narrows what is displayed in subsequent network pages, providing for a more streamlined and efficient user experience and decreasing time spent sorting through options.

Each of the plurality of selectable elements 1410 may correspond to one of the options for the tenth characteristic of the driveshaft. User selection of one of the plurality of selectable elements 1410 indicates to the interactive search system the ninth characteristic of the driveshaft that the options of OEM part numbers may satisfy in order to remain an option for the driveshaft. For example, if the user selection indicates that the high angle yoke, all OEM part numbers that include low angle yokes may be filtered out of the available options. In this way, the tenth characteristic of the driveshaft may be determined based on user input via the interactive search system, thereby further narrowing a set of potential part numbers to a tenth subset. In some examples, the tenth subset may include only one OEM part number, indicating that the OEM part number of the driveshaft has been identified. In other examples, one of the first, second, third, fourth, fifth, sixth, seventh, eighth, and ninth subsets may include only one OEM part number. In yet other examples, the tenth subset may include more than one OEM part number, indicating that additional characteristic specification and filtering is needed to determine the part number of the driveshaft.

In some examples, user selection of one of the plurality of selectable elements 1410 may trigger display of a subsequent network page that displays a page for determination of an eleventh characteristic, options displayed therein further narrowed based on the user selection at the thirteenth network page 1400. In other examples, user selection of one of the plurality of selectable elements 1410 may trigger identification of the OEM part number of the driveshaft and display of a final network page. In other examples, a "save" or "next" button may also be included in the thirteenth network page 1400 that may be selected following user selection of one of the plurality of selectable elements 1410. User selection of the "save" or "next" button may trigger display of the subsequent or final network page.

Figure 15:
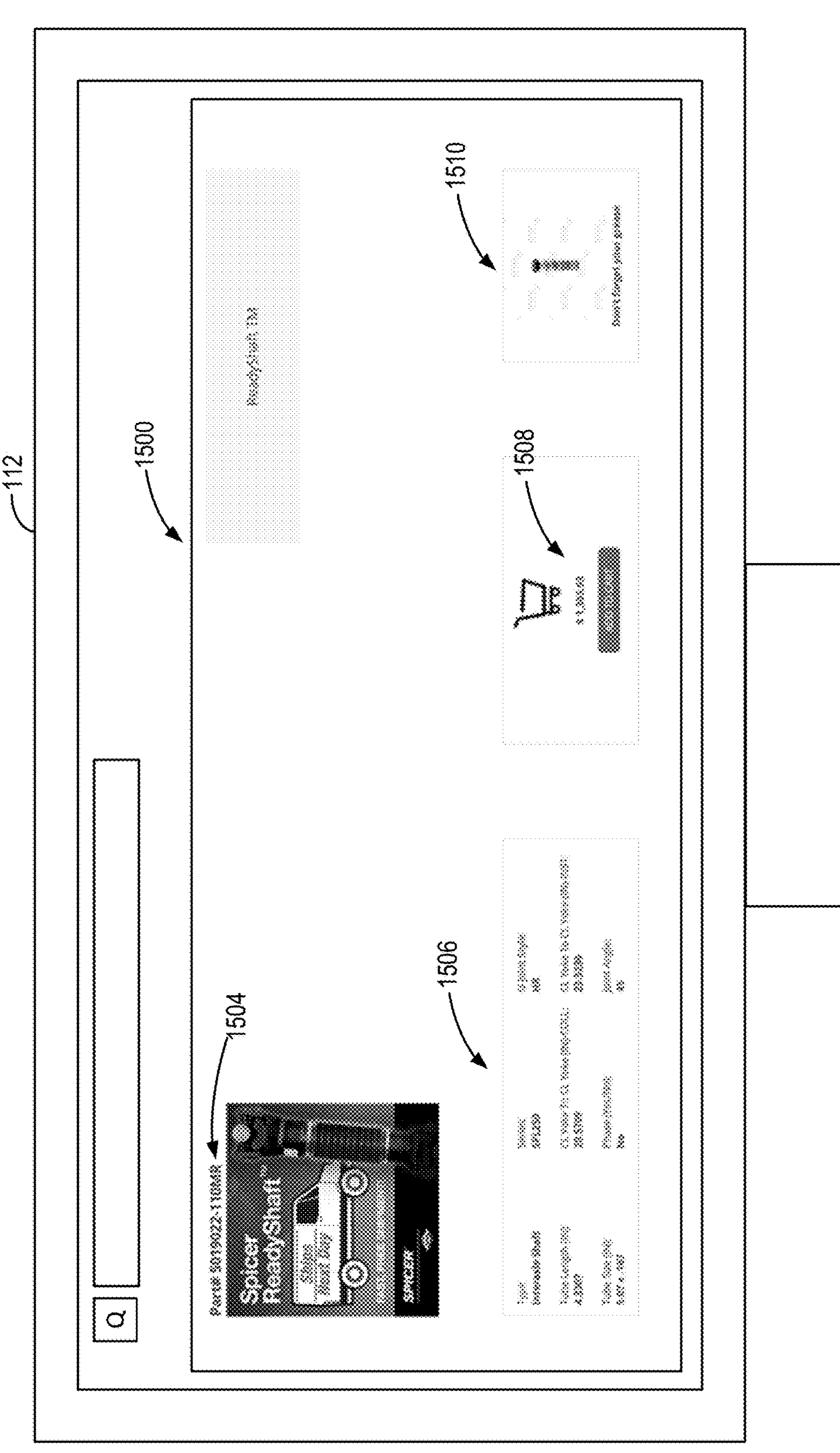
FIG. 15 shows an example of a final network page of the browser.

In response to identification of the OEM part number specific to the driveshaft of interest, the final network page may be displayed within the interface of the browser. FIG. 15 shows an example of a final network page 1500. The final network page 1500 may be displayed within the browser that each of the previous network pages in communication with the interactive search system were displayed. In some examples, the final network page 1500 may comprise a depiction of a driveshaft corresponding to an identified OEM part number 1504 and a panel 1506 of characteristics specific to the identified OEM part number 1504. In this way, the user may confirm the identification by double checking the characteristics displayed in the panel 1506 with selections made in prior network pages.

In some examples, the final network page 1500 further includes a selectable link 1508. The selectable link 1508 may be connected to the electronic commerce system so that, when selected, a commerce network page is launched, either within the same browser window as the final network page 1500 or within a new browser window, which is capable of engaging in commerce for the driveshaft corresponding to the identified OEM part number (e.g., the user may purchase the driveshaft through the commerce network page).

In some examples, the final network page 1500 further includes a second link 1510 to a second commerce network page. The second link 1510, similar to the selectable link 1508, may be connected to the electronic commerce system so that, when selected, the second commerce network page is launched, allowing for engagement of commerce of a product. A depiction of the product may or may not be displayed as or along with the second link 1510 in the final network page 1500. The final network page 1500 and other network pages herein described allow for smooth transition between the interactive search system and the electronic commerce system, increasing user satisfaction and decreasing time spent searching for multiple products separately.

Figure 16A:
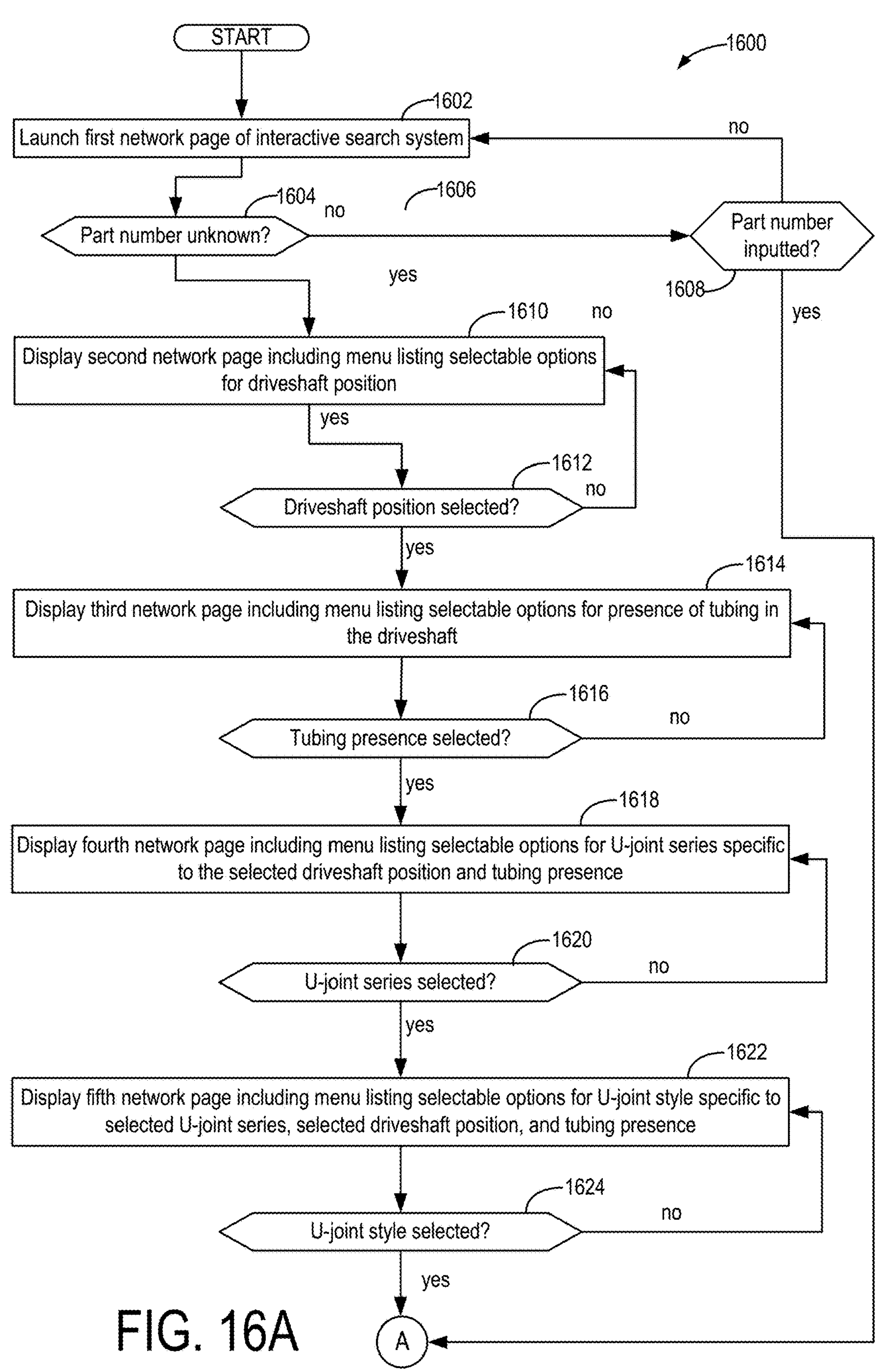
FIGS. 16A, 16B, and 16C show a flowchart illustrating a method for operating the interactive search system.
Figure 16B:
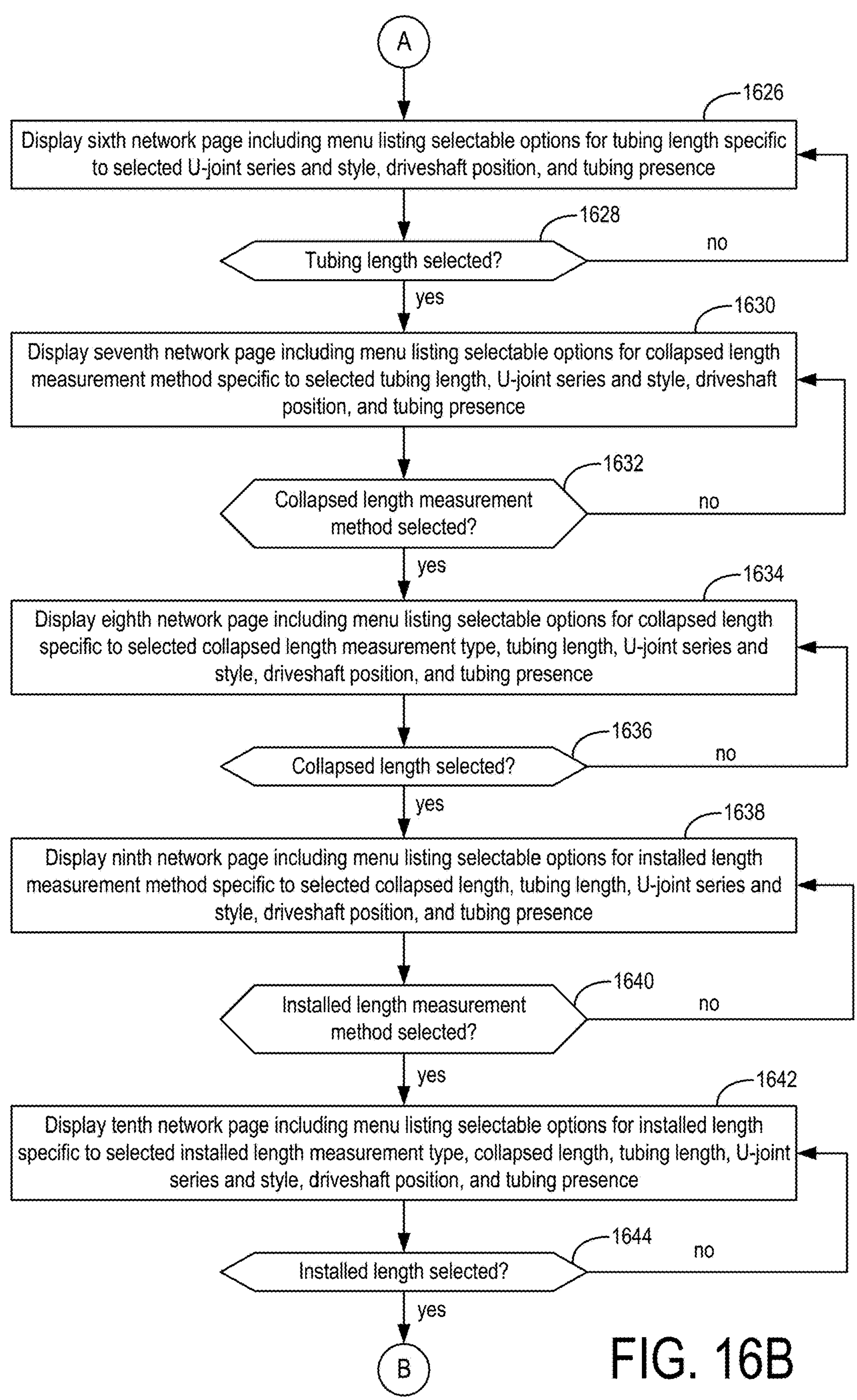
Figure 16C:
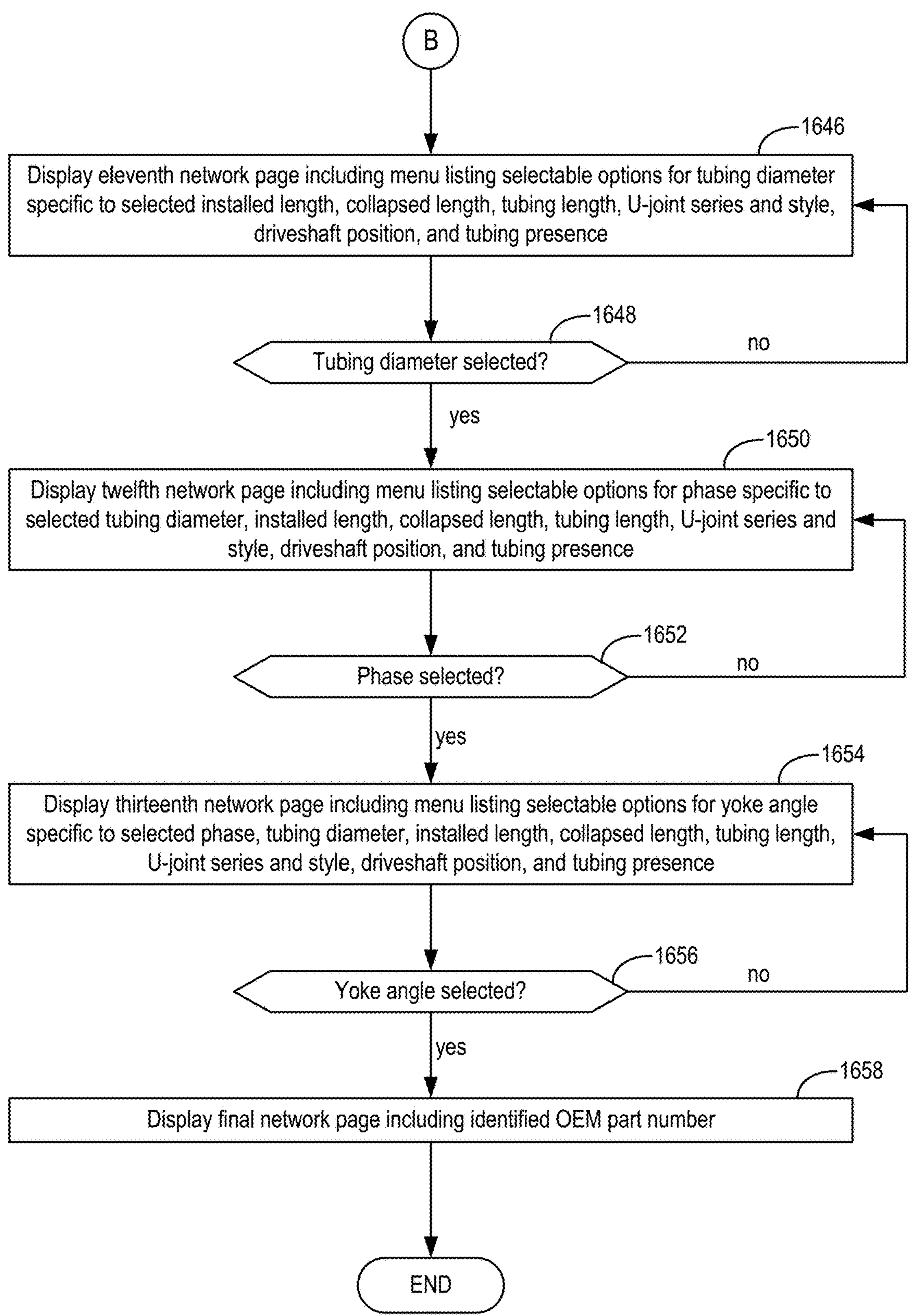

Referring now to FIGS. 16A-16C, a flowchart illustrating an example method 1600 for triggering and displaying network pages in communication with an interactive search system, such as interactive search system 105 of FIG. 1, is shown. Method 1600 may be executed according to instructions stored in memory of a computing system and executed by one or more processors of the computing system, such as computing system 100 of FIG. 1. As explained above, the computing system may include a database of a set of options for an OEM part number including a plurality of characteristics for each of the options. User selection at network pages triggers filtering and display of the options and characteristics via the interactive search system, as described by way of example above. Each of the network pages and menus herein described may be displayed within an interface of a browser displayed by a display device of a user device that is connected to the interactive search system via a network (e.g., the Internet). The network pages and displayed characteristics for each network page herein described are provided as illustrative and non-limiting. Other characteristics and network pages may be displayed without departing from the scope of this disclosure.

Starting at FIG. 16A, at 1602, the method 1000 includes launching a first network page of the interactive search system. The first network page may be launched in response to a user selection to a browser that indicates a demand to identify an OEM part number for a driveshaft of interest. The first network page may include a plurality of selectable elements that when selected trigger display of a subsequent network page. Which of the plurality of selectable elements is selected indicates whether the OEM part number is known by the user or unknown by the user. In some examples, the first network page may include a search bar for inputting the known part number.

At 1604, the method 1000 judges whether the OEM part number is unknown. User selection of one of the plurality of selectable elements of the first network page determines whether the part number is known or unknown. If the part number is known (no at 1604), method 1600 proceeds to 1608. If the part number is unknown (yes at 1604), method 1600 proceeds to 1610.

At 1608, the method 1600 judges whether the known part number has been inputted into the search bar in the first network page. User selection of a search or submit button may indicate to the interactive search system that the part number has been inputted. If the part number has been inputted (yes at 1608), method 1600 proceeds to 1658 (see FIG. 16C). If the part number has not been inputted (no at 1608), method 1600 returns to 1002 to continue displaying the first network page and the search bar therein.

At 1610, the method 1600 includes displaying a second network page including a menu listing selectable options for driveshaft position in response to user selection that the OEM part number of the driveshaft of interest is unknown. Driveshaft position may be, in some examples, a first characteristic of the driveshaft of interest that narrows the set of options for the OEM part number to a first subset. The selectable options listed in the menu may be the selectable elements 308 depicted in FIG. 3. User selection of one of the selectable options may indicate to the interactive search system which position characteristic corresponds with the driveshaft of interest and may trigger display of a third network page that includes a menu with options for a second characteristic, the options displayed being narrowed based on the user selection of the first characteristic.

At 1612, the method 1000 judges whether the driveshaft position for the driveshaft of interest has been selected. As described, user selection of one of the selectable options in the menu of the second network page indicates to the interactive search system the driveshaft position of the driveshaft of interest. If user selection of driveshaft position has been inputted (yes at 1612), method 1600 proceeds to 1614. If user selection of driveshaft position has not been inputted (no at 1612), method 1600 returns to 1610 to continue displaying the second network page and the menu therein.

At 1614, the method 1600 includes displaying the third network page including a menu listing selectable options for presence of tubing in the driveshaft in response to user selection at the second network page, the options for presence of tubing that are displayed being specific to the driveshaft position selected at the second network page. Presence of tubing may be the second characteristic of the driveshaft used to narrow the first subset of options for the OEM part number to a second subset. The selectable options for presence of tubing listed in the menu may be the selectable elements 408, 410 depicted in FIG. 4. User selection of one of the selectable options may indicate to the interactive search system which tubing presence characteristic corresponds with the driveshaft and may trigger display of a fourth network page that includes a menu with options for a third characteristic, the options displayed being narrowed based on the user selection of the first and second characteristics.

At 1616, the method 1600 judges whether the tubing presence for the driveshaft has been selected. As described, user selection of one of the selectable options in the menu of the third network page indicates to the interactive search system the tubing presence of the driveshaft. If user selection of tubing presence has been inputted (yes at 1616), method 1600 proceeds to 1618. If user selection of tubing presence as not been inputted (no at 1616), method 1600 returns to 1614 to continue displaying the third network page and the menu therein.

At 1618, the method 1600 includes displaying the fourth network page including a menu listing selectable options for U-joint series of the driveshaft in response to user selection at the third network page, the options for U-joint series that are displayed being specific to the selected driveshaft position and selected tubing presence at the second and third network pages. U-joint series may be the third characteristic of the driveshaft of interest used to narrow the second subset of options for the OEM part number to a third subset. The selectable options for U-joint series listed in the menu may be the selectable elements 510 depicted in FIG. 5. User selection of one of the selectable options may indicate to the interactive search system which series characteristic corresponds with the driveshaft of interest and may trigger display of a fifth network page that includes a menu with options for a fourth characteristic, the options displayed being narrowed based on the user selection of the first, second, and third characteristics.

At 1620, the method 1600 judges whether the U-joint series for the driveshaft has been selected. As described, user selection of one of the selectable options in the menu of the fourth network page indicates to the interactive search system the U-joint series of the driveshaft. If user selection of U-joint series has been inputted (yes at 1620), method 1600 proceeds to 1622. If user selection of U-joint series has not been inputted (no at 1620), method 1600 returns to 1618 to continue displaying the fourth network page and the menu therein.

At 1622, the method 1600 includes displaying the fifth network page including a menu listing selectable options for U-joint style of the driveshaft, the options for U-joint style that are displayed being specific to the selected driveshaft position, the selected tubing presence, and the selected U-joint series at the second, third, and fourth network pages. U-joint style may be the fourth characteristic of the driveshaft used to narrow the third subset of options for the OEM part number to a fourth subset. The selectable options for U-joint style listed in the menu may be the selectable elements 610 depicted in FIG. 6. User selection of one of the selectable options may indicate to the interactive search system which U-joint style characteristic corresponds with the driveshaft and may trigger display of a sixth network page that includes a menu with options for a fifth characteristic, the options displayed being narrowed based on the user selection of the first, second, third, and fourth characteristics.

At 1624, the method 1600 judges whether the U-joint style for the driveshaft has been selected. As described, user selection of one of the selectable options in the menu of the fifth network page indicates to the interactive search system the U-joint style of the driveshaft. If user selection of U-joint style has been inputted (yes at 1624), method 1600 proceeds to 1626. If user selection of U-joint style has not been inputted (no at 1624), method 1600 returns to 1622 to continue displaying the fifth network page and the menu therein.

Continuing at FIG. 16B, at 1626, the method 1600 includes displaying the sixth network page including a menu listing selectable options for tube length of the driveshaft, the options for tube length that are displayed being specific to the selected driveshaft position, the selected tubing presence, the selected U-joint series, and the selected U-joint style at the second, third, fourth, and fifth network pages. Tube length may be the fifth characteristic of the driveshaft of interest used to narrow the fourth subset of options for the OEM part number to a fifth subset. The selectable options for tube length listed in the menu may be the selectable elements 708 depicted in FIG. 7. User selection of one of the selectable options may indicate to the interactive search system which tube length characteristic corresponds with the driveshaft of interest and may trigger display of a seventh network page that includes a menu with options for a sixth characteristic, the options displayed being narrowed based on the user selection of the first, second, third, fourth, and fifth characteristics.

At 1628, the method 1600 judges whether the tube length for the driveshaft of interest has been selected. As described, user selection of one of the selectable options in the menu of the sixth network page indicates to the interactive search system the tube length of the driveshaft. If user selection of tube length has been inputted (yes at 1628), method 1600 proceeds to 1630. If user selection of tube length has not been inputted (no at 1628), method 1600 returns to 1626 to continue displaying the sixth network page and the menu therein.

At 1630, the method 1600 includes displaying the seventh network page including one or more menus listing selectable options for collapsed length measurement method for the driveshaft, the options for the one or more collapsed length measurement methods that are displayed being specific to the selected driveshaft position, the selected tubing presence, the selected U-joint series, the selected U-joint style, and the selected tube length at the second, third, fourth, fifth, and sixth network pages. The selectable options for each of the collapsed length measurement methods listed in the one or more menus may be the selectable elements 810 depicted in FIG. 8. User selection of one of the selectable options in each of the one or more menus may indicate to the interactive search system a method for measurement of the collapsed length of the driveshaft of interest and may trigger display of a subsequent network page. The subsequent network page that is displayed following user selections at the seventh network page may be an eighth network page that displays options for the sixth characteristic.

At 1632, the method 1600 judges whether the collapsed length measurement method for the driveshaft has been selected. As described, user selection of one of the selectable options in each of the one or more menus of the seventh network page indicates to the interactive search system the collapsed length measurement method of the driveshaft. If user selections have been inputted (yes at 1632), method 1600 proceeds to 1634. If user selections have not been inputted (no at 1632), method 1600 returns to 1630 to continue displaying the seventh network page and the one or more menus therein.

At 1634, the method 1600 displays the eighth network page including a menu listing selectable options for collapsed length of the driveshaft, the options for collapsed length that are displayed being specific to the selected driveshaft position, the selected tubing presence, the selected U-joint series, the selected U-joint style, the selected tubing length, and the selected collapsed length measurement method at the second, third, fourth, fifth, sixth, and seventh network pages. Collapsed length may be the sixth characteristic of the driveshaft used to narrow the fifth subset of options for the OEM part number to a sixth subset. The selectable options for collapsed length listed in the menu may be the selectable elements 908, 912 depicted in FIG. 9. User selection of one of the selectable options may indicate to the interactive search system which collapsed length characteristic corresponds with the driveshaft of interest and may trigger display of a ninth network page that includes a menu with options for measurement method of a seventh characteristic, the options displayed being narrowed based on the user selection of the first, second, third, fourth, fifth, and sixth characteristics.

At 1636, the method 1600 judges whether the collapsed length for the driveshaft has been selected. As described, user selection of one of the selectable options in each of the one or more menus of the eighth network page indicates to the interactive search system the collapsed length of the driveshaft. If user selections have been inputted (yes at 1636), method 1600 proceeds to 1638. If user selections have not been inputted (no at 1636), method 6 returns to 1634 to continue displaying the eighth network page and the one or more menus therein.

At 1638, the method 1600 displays the ninth network page including a menu listing selectable options for installed length measurement method for the driveshaft, the options for the one or more installed length measurement methods that are displayed being specific to the selected driveshaft position, the selected tubing presence, the selected U-joint series, the selected U-joint style, the selected tube length, and the selected collapsed length at the second, third, fourth, fifth, sixth, and eighth network pages. The selectable options for each of the installed length measurement methods listed in the one or more menus may be the selectable elements 1010 depicted in FIG. 10. User selection of one of the selectable options in each of the one or more menus may indicate to the interactive search system a method for measurement of the installed length of the driveshaft of interest and may trigger display of a subsequent network page. The subsequent network page that is displayed following user selections at the ninth network page may be a tenth network page that displays options for the seventh characteristic.

At 1640, the method 1600 judges whether the installed length measurement method for the driveshaft has been selected. As described, user selection of one of the selectable options in each of the one or more menus of the ninth network page indicates to the interactive search system the installed length measurement method of the driveshaft. If user selections have been inputted (yes at 1640), method 1600 proceeds to 1642. If user selections have not been inputted (no at 1640), method 1600 returns to 1638 to continue displaying the ninth network page and the one or more menus therein.

At 1642, the method 1600 displays the tenth network page including a menu listing selectable options for installed length of the driveshaft, the options for installed length that are displayed being specific to the selected driveshaft position, the selected tubing presence, the selected U-joint series, the selected U-joint style, the selected tubing length, the selected collapsed length, and the selected installed length measurement method at the second, third, fourth, fifth, sixth, eighth, and ninth network pages. Installed length may be the seventh characteristic of the driveshaft used to narrow the sixth subset of options for the OEM part number to a seventh subset. The selectable options for installed length listed in the menu may be the selectable elements 1108, 1112 depicted in FIG. 11. User selection of one of the selectable options may indicate to the interactive search system which installed length characteristic corresponds with the driveshaft of interest and may trigger display of an eleventh network page that includes a menu with options for an eighth characteristic, the options displayed being narrowed based on the user selection of the first, second, third, fourth, fifth, sixth, and seventh characteristics.

At 1644, the method 1600 judges whether the installed length of the driveshaft has been selected. As described, user selection of one of the selectable options in each of the one or more menus of the tenth network page indicates to the interactive search system the installed length of the driveshaft. If user selections have been inputted (yes at 1644), method 1600 proceeds to 1646. If user selections have not been inputted (no at 1644), method 1600 returns to 1642 to continue displaying the tenth network page and the one or more menus therein.

Continuing to FIG. 16C, at 1646, the method 1600 displays the eleventh network page including a menu listing selectable options for tubing diameter of the driveshaft, the options for tubing diameter that are displayed being specific to the selected driveshaft position, the selected tubing presence, the selected U-joint series, the selected U-joint style, the selected tubing length, the selected collapsed length, and the selected installed length at the second, third, fourth, fifth, sixth, eighth, and tenth network pages. Tubing diameter may be the eighth characteristic of the driveshaft used to narrow the seventh subset of options for the OEM part number to an eighth subset. The selectable options for tubing diameter listed in the menu may be the selectable elements 1208, 1212 depicted in FIG. 12. User selection of one of the selectable options may indicate to the interactive search system which tubing diameter characteristic corresponds with the driveshaft of interest and may trigger display of a twelfth network page that includes a menu with options for a ninth characteristic, the options displayed being narrowed based on the user selection of the first, second, third, fourth, fifth, sixth, seventh, and eighth characteristics.

At 1648, the method 1600 judges whether the tubing diameter of the driveshaft has been selected. As described, user selection of one of the selectable options in each of the one or more menus of the eleventh network page indicates to the interactive search system the tubing diameter of the driveshaft. If user selections have been inputted (yes at 1648), method 1600 proceeds to 1650. If user selections have not been inputted (no at 1648), method 1600 returns to 1646 to continue displaying the eleventh network page and the one or more menus therein.

At 1650, the method 1600 displays the twelfth network page including a menu listing selectable options for yoke phase of the driveshaft, the options for yoke phase that are displayed being specific to the selected driveshaft position, the selected tubing presence, the selected U-joint series, the selected U-joint style, the selected tubing length, the selected collapsed length, the selected installed length, and the selected tubing diameter at the second, third, fourth, fifth, sixth, eighth, tenth, and eleventh network pages. Yoke phase may be the ninth characteristic of the driveshaft used to narrow the eighth subset of options for the OEM part number to a ninth subset. The selectable options for yoke phase listed in the menu may be the selectable elements 1310 depicted in FIG. 13. User selection of one of the selectable options may indicate to the interactive search system which yoke phase characteristic corresponds with the driveshaft of interest and may trigger display of a thirteenth network page that includes a menu with options for a tenth characteristic, the options displayed being narrowed based on the user selection of the first, second, third, fourth, fifth, sixth, seventh, eighth, and ninth characteristics.

At 1652, the method 1600 judges whether the yoke phase of the driveshaft has been selected. As described, user selection of one of the selectable options in each of the one or more menus of the twelfth network page indicates to the interactive search system the yoke phase of the driveshaft. If user selections have been inputted (yes at 1652), method 1600 proceeds to 1654. If user selections have not been inputted (no at 1652), method 1600 returns to 1650 to continue displaying the twelfth network page and the one or more menus therein.

At 1654, the method 1600 displays the thirteenth network page including a menu listing selectable options for yoke angle of the driveshaft, the options for yoke angle that are displayed being specific to the selected driveshaft position, the selected tubing presence, the selected U-joint series, the selected U-joint style, the selected tubing length, the selected collapsed length, the selected installed length, the selected tubing diameter, and the selected yoke phase at the second, third, fourth, fifth, sixth, eighth, tenth, eleventh, and twelfth network pages. Yoke angle may be the tenth characteristic of the driveshaft used to narrow the ninth subset of options for the OEM part number to a tenth subset. The selectable options for yoke angle listed in the menu may be the selectable elements 1410 depicted in FIG. 14. User selection of one of the selectable options may indicate to the interactive search system which yoke angle characteristic corresponds with the driveshaft of interest and may trigger display of a fourteenth network page, which in some examples may be a final network page displaying an identified OEM part number of the driveshaft, the OEM part number being identified based on the user selection of the first, second, third, fourth, fifth, sixth, seventh, eighth, ninth, and tenth characteristics.

At 1656, the method 1600 judges whether the yoke angle of the driveshaft has been selected. As described, user selection of one of the selectable options in each of the one or more menus of the thirteenth network page indicates to the interactive search system the yoke angle of the driveshaft. If user selections have been inputted (yes at 1656), method 1600 proceeds to 1658.

If user selections have not been inputted (no at 1656), method 1600 returns to 1654 to continue displaying the thirteenth network page and the one or more menus therein.

At 1658, method 1600 includes displaying the final network page including the identified OEM part number for the driveshaft of interest. The final network page may be displayed in response to user selection of the yoke angle characteristic at the thirteenth network page provided that the tenth subset of options for the OEM part number is sufficient for identification of the OEM part number corresponding to the driveshaft of interest (e.g., the tenth subset contains a single option). In other examples, the final network page may be displayed in response to user selection(s) for additional characteristics at subsequent network pages, as described above. Following 1658, the method 1600 may end.

Figure 17:
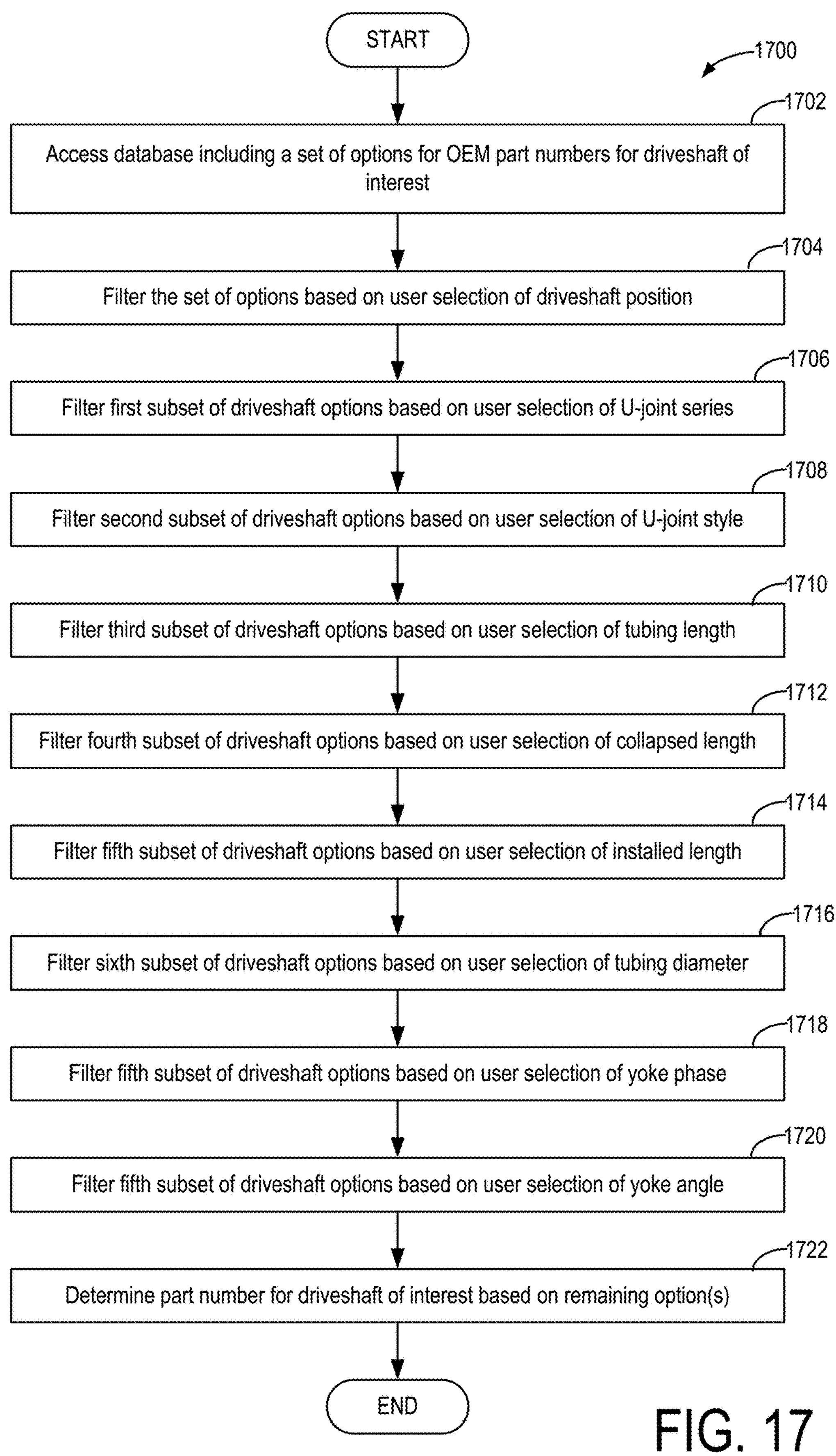
FIG. 17 shows a flowchart illustrating a method for identifying an OEM part number of a driveshaft using the interactive search system.

Referring now to FIG. 17, a method 1700 for operating an interactive search system such as interactive search system 105 of FIG. 1 is shown. Method 1700 may be executed according to instructions stored in memory of a computing system and executed by one or more processors of the computing system, such as computing system 100 of FIG. 1A. As explained above, the interactive search system may be coupled to other otherwise include a database of a set of options for an OEM part number including a plurality of characteristics for each of the options, such as database 108 described with respect to FIG. 1B. User selection at network pages triggers filtering and display of the options and characteristics via the interactive search system, as described by way of example above. User selections herein described may be user inputs to a user interface of a browser displayed by a display device of a user device that is connected to the interactive search system via a network (e.g., the Internet). The interactive search system may employ one or more algorithms in order to sequentially narrow or filter the available options. The method 1700 herein described is provided as a non-limiting example of operation of the interactive search system. For example, the characteristics herein described (e.g., driveshaft position, U-joint series, etc.) are provided as examples and are non-limiting. More, less, or alternative characteristics may be used without departing from the scope of this disclosure.

At 1702, method 1700 includes accessing the database that includes a set of options for OEM part numbers for a driveshaft of interest. The database may be included in non-transitory memory of a computing device of the computing system and may be accessible by the processor in response to user selections indicating a demand to either launch the interactive search system or to filter the set of options for OEM part numbers based on determined characteristics. The set of options for OEM part numbers for the driveshaft may be numerous such that manually sorting through them is impractical. Finding a single OEM part number manually may be challenging and time consuming. As described with reference to method 1600, user selection(s) may be inputted to the user interface of the browser (e.g., a network page) indicating a plurality of characteristics of the driveshaft of interest. Each of the user selections may be received by the interactive search system and may result in sequential narrowing of available options for OEM part numbers.

The database may be structured as described with respect to FIG. 1B, whereby various modules comprise different sets of data. For example, one module may comprise all the available OEM part numbers, while other modules may comprise available OEM part numbers that correspond to a particular characteristic. In some examples, a characteristic may have one or more options, whereby each option correspond to one or more OEM part numbers. For example, tubing diameter may have a plurality of options, a first option corresponding to a first set of OEM part numbers, a second option corresponding to a second set of OEM part numbers, and so on. The order in which the entire set of available OEM part numbers is filtered may increase efficiency of determination of a single OEM part number, as is the goal of the interactive search system. Omitting certain characteristics or filtering based on a different order of characteristics may result in output of multiple options for OEM part numbers at the final network page. In this way, the database structure and the interactive search system herein provided increases efficiency of OEM part number determination for the user as well as for the computing system.

At 1704, method 1700 includes filtering the set of options for OEM part numbers for the driveshaft of interest based on and/or in response to user selection of a driveshaft position of the driveshaft of interest. Filtering the set of options based on the selected driveshaft position may result in a first subset of options for OEM part numbers. The first subset of OEM part numbers may include all OEM part numbers that correspond to the selected driveshaft position.

At 1706, method 1700 includes filtering the first subset of options for OEM part numbers based on and/or in response to user selection of presence of tubing in the driveshaft of interest. Filtering the first subset of options based on the selected tubing presence may result in a second subset of options for OEM part numbers, the second subset being a subset of the first subset. The second subset of OEM part numbers may include all OEM part numbers that correspond to both the selected driveshaft position and the selected tubing presence.

At 1708, method 1700 includes filtering the second subset of options for OEM part numbers based on and/or in response to user selection of a U-joint series of the driveshaft of interest. Filtering the second subset of options based on the selected U-joint series may result in a third subset of options for OEM part numbers, the third subset being a subset of the second subset. The third subset may include all available OEM part numbers that correspond to the selected driveshaft position, the selected tubing presence, and the selected U-joint series.

At 1710, method 1700 includes filtering the third subset of options for OEM part numbers based on and/or in response to user selection of a tube length of the driveshaft of interest. Filtering the third subset of options based on the selected tube length may result in a fourth subset of options for OEM part numbers, the fourth subset being a subset of the third subset. The fourth subset may include all OEM part numbers that correspond to all of the selected driveshaft position, the selected tubing presence, the selected U-joint series, and the selected tube length.

At 1712, method 1700 includes filtering the fourth subset of options for OEM part numbers based on and/or in response to user selection of a collapsed length of the driveshaft of interest. Filtering the fourth subset of options based on the selected collapsed length may result in a fifth subset of options for OEM part numbers, the fifth subset being a subset of the fourth subset. The fifth subset may include all OEM part numbers that correspond to all of the selected driveshaft position, the selected tubing presence, the selected U-joint series, the selected tube length, and the selected collapsed length.

At 1714, method 1700 includes filtering the fifth subset of options for OEM part numbers based on and/or in response to user selection of an installed length of the driveshaft of interest. Filtering the fifth subset of options based on the selected installed length may result in a sixth subset of options for OEM part numbers. The sixth subset may include all OEM part numbers that correspond to all of the selected driveshaft position, the selected tubing presence, the selected U-joint series, the selected tube length, the selected collapsed length, and the selected installed length.

At 1716, method 1700 includes filtering the sixth subset of options for OEM part numbers based on and/or in response to user selection of a tubing diameter of the driveshaft of interest. Filtering the sixth subset of options based on the selected tubing diameter may result in a seventh subset of options for OEM part numbers. The seventh subset may include all OEM part numbers that correspond to all of the selected driveshaft position, the selected tubing presence, the selected U-joint series, the selected tube length, the selected collapsed length, the selected installed length, and the selected tubing diameter.

At 1718, method 1700 includes filtering the seventh subset of options for OEM part numbers based on and/or in response to user selection of a yoke phase of the driveshaft of interest. Filtering the seventh subset of options based on the selected yoke phase may result in an eighth subset of options for OEM part numbers. The eighth subset may include all OEM part numbers that correspond to all of the selected driveshaft position, the selected tubing presence, the selected U-joint series, the selected tube length, the selected collapsed length, the selected installed length, the selected tubing diameter, and the selected yoke phase.

At 1720, method 1700 includes filtering the eighth subset of options for OEM part numbers based on and/or in response to user selection of a yoke angle of the driveshaft of interest. Filtering the eighth subset of options based on the selected yoke angle may result in a ninth subset of options for OEM part numbers. The ninth subset may include all OEM part numbers that correspond to all of the selected driveshaft position, the selected tubing presence, the selected U-joint series, the selected tube length, the selected collapsed length, the selected installed length, the selected tubing diameter, the selected yoke phase, and the selected yoke angle. In some examples, the ninth subset may include only one OEM part number, in which case the method 1700 proceeds to 1722 to determine the OEM part number for the driveshaft of interest based on this remaining option.

Because of the vast number of OEM part numbers available overall and for each individual option of all the characteristics herein described, manually cross-referencing all OEM part numbers would be inordinately time consuming and therefore not feasible for the user. The method and systems herein provided may thus allow for more efficient determination of an OEM part number. Further, the first of the subsets to contain only one may indicate to the interactive search system which OEM part number corresponds to the driveshaft of interest. In some instances, the first subset to include only one may not be the ninth subset and in such cases, the interactive search system may trigger display of the final network page while omitting network pages for determining subsequent characteristics. In this way, processing efficiency may be increased by omitting display of unnecessary network pages and decreasing filtering steps and user inputs needed to determine the OEM part number.

A technical effect of the methods herein described is that based on user interaction with a user interface of a browser connected to an interactive search system and a database of part numbers, an OEM part number for a driveshaft of interest previously unknown may be identified. User interaction with the user interface reduces time spent searching through possible options for part numbers and increases user satisfaction by reducing time spent contacting entities such as the manufacturer. Further, the configuration of the interactive search system, with the order of characteristics configured for most efficiently determining the OEM part number, may reduce processing power demanded by the computing system by reducing number of filtering steps, number of user inputs, and the like. The database structure and interactive search system may provide an efficiency manner of sequentially filtering options to allow a user to determine the OEM part number without needing to manually cross-reference numbers and characteristics.

Additionally, limited lists accessible through the user interface may reduce time spent in transition between a vehicle in which the driveshaft of interest is or was installed by providing information of next steps that the user is to take, including informing the user of information such as whether the driveshaft of interest is to remain installed in the vehicle or to be removed in advance. Further, elements included in the user interface (e.g., network pages of the browser) may provide links to an electronic commerce system specific to items described or shown in the elements, thereby reducing time spent searching the electronic commerce system for those items as well as providing a smooth transition between the interactive search system and the electronic commerce system.

The disclosure also provides support for a computing device comprising a display screen, the computing device being configured to display on the display screen a menu listing one or more part numbers and one or more characteristics of a driveshaft included in a database, and additionally being configured to display on the display screen a user interface that can be reached directly from the menu, wherein the user interface includes a first network page displayed therein that displays, for a first characteristic of the one or more characteristics, a limited list of options available to be selected, the limited list of options obtained from the database, each option in the limited list being selectable to launch a subsequent network page of the user interface and enabling the selected option to be seen within the user interface, and wherein the user interface is displayed while the database is in an un-launched state. In a first example of the system, the subsequent network page of the user interface displays, for a second characteristic of the one or more characteristics, options thereof available to be selected to launch a second subsequent network page of the user interface. In a second example of the system, optionally including the first example, the one or more part numbers included in the database are narrowed to a first subset in response to user selection of a first option of the limited list of options of the first characteristic displayed within the first network page, the first subset being specific to the first option. In a third example of the system, optionally including one or both of the first and second examples, the first subset is further narrowed to a second subset in response to user selection of a second option of limited list of options of a second characteristic displayed within the subsequent network page, the second subset being specific to the first option of the first characteristic and the second option of the second characteristic. In a fourth example of the system, optionally including one or more or each of the first through third examples, the first network page of the user interface further displays one or more elements providing information of one of the first characteristic, wherein the one or more elements are selectable to launch a pop-up window within the user interface, the pop-up window providing additional information of the second characteristic. In a fifth example of the system, optionally including one or more or each of the first through fourth examples, the user interface further displays a selectable link of an item that, when selected, launch a commerce network page for the item connected to an electronic commerce system.

The disclosure also provides support for a method for a web-based step-by-step interactive search system, the method comprising: accessing a database identifying a plurality of original equipment manufacturer (OEM) part numbers, the database including a plurality of characteristics, wherein each characteristic comprises one or more options that each correspond to one or more of the plurality of OEM part numbers, receiving user inputs selecting an option of each of the plurality of characteristics of a driveshaft, sequentially filtering the plurality of OEM part numbers based on each option of the plurality of characteristics selected by the user inputs, and identifying an OEM part number for the driveshaft based on the selected options of the plurality of characteristics. In a first example of the method, the plurality of characteristics of the driveshaft includes one or more of driveshaft position, tubing presence, U-joint series, U-joint style, tube length, collapsed length, installed length, tubing diameter, yoke phase, and yoke angle. In a second example of the method, optionally including the first example, receiving input is based on user selection of selectable elements within one or more network pages in communication with the interactive search system. In a third example of the method, optionally including one or both of the first and second examples, the method further comprises: displaying the one or more network pages to a user, each of the one or more network pages including a plurality of selectable elements that when selected trigger display of a subsequent network page and filtering of the plurality of OEM part numbers. In a fourth example of the method, optionally including one or more or each of the first through third examples, the one or more network pages each further include one or more of instructional diagrams, instructional videos, and instructional labels, wherein at least a portion of the instructional diagrams, instructional videos, and instructional labels are selectable to provide additional information regarding the one or more characteristics. In a fifth example of the method, optionally including one or more or each of the first through fourth examples, sequentially filtering the plurality of OEM part numbers is based on input of a first characteristic to determine a first subset of the plurality of OEM part numbers. In a sixth example of the method, optionally including one or more or each of the first through fifth examples, filtering the first subset of the plurality of OEM part numbers is based on input of a second characteristic to determine a second subset of the plurality of OEM part numbers. In a seventh example of the method, optionally including one or more or each of the first through sixth examples, the method further comprises: displaying to a user the identified OEM part number corresponding to the driveshaft within a final network page. In a eighth example of the method, optionally including one or more or each of the first through seventh examples, the method further comprises: displaying a commerce network page in response to user selection of a selectable link within the final network page, wherein the commerce network page allows for purchase of the driveshaft via an electronic commerce system.

The disclosure also provides support for a computing system for web-based step-by-step interactive searching, comprising: a processor of a computing device connected to a network, non-transitory memory including instructions that when executed by the processor enable the computing system to: access a database identifying a plurality of OEM part numbers that includes a plurality of characteristics for each of the plurality of OEM part numbers, receive user selections of one or more characteristics of a driveshaft, and filter the plurality of OEM part numbers in response to the user selections, and one or more network pages of a user interface displayed on a display screen of a user device in communication with the computing device via the network, the one or more network pages displaying selectable elements indicating options for each of the plurality of characteristics, wherein the user selections are inputted into the user interface. In a first example of the system, the plurality of characteristics includes one or more of driveshaft position, tubing presence, U-joint series, U-joint style, tube length, installed length, collapsed length, tubing diameter, yoke phase, and yoke angle. In a second example of the system, optionally including the first example, a first network page of the one or more network pages includes a plurality of selectable elements that when selected trigger display of a second network page, the second network page displaying information specific to a first characteristic of the plurality of characteristics. In a third example of the system, optionally including one or both of the first and second examples, the second network page further includes one or more selectable elements that when hovered over provide information of a second characteristic of the plurality of characteristics, information of the second characteristic being specific to a selected option of the first characteristic. In a fourth example of the system, optionally including one or more or each of the first through third examples, instructions included in the non-transitory memory further enable the processor to determine an OEM part number corresponding to the driveshaft based on sequential filtering of the plurality of OEM part numbers based on user inputs to the user interface, the OEM part number being displayed in a final network page of the user interface.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A computing device comprising a display screen, the computing device being configured to display on the display screen a menu listing a plurality of driveshaft part numbers potentially suitable for a given vehicle and one or more driveshaft characteristics, wherein the plurality of driveshaft part numbers and the one or more driveshaft characteristics are stored within a database, and additionally being configured to display on the display screen a user interface that can be reached directly from the menu, wherein:

the user interface includes a first network page displayed therein that displays, for a first driveshaft characteristic of the one or more driveshaft characteristics, a limited list of options available to be selected, the limited list of options obtained from the database;

each option in the limited list being selectable to launch a subsequent network page of the user interface and enabling the selected option to be seen within the user interface;

selection of options for the one or more driveshaft characteristics narrows the plurality of driveshaft part numbers that are suitable for the vehicle to an identified part number; and the identified part number is unknown prior to selection of the options for the one or more driveshaft characteristics.

2. The computing device of claim 1, wherein the subsequent network page of the user interface displays, for a second characteristic of the one or more characteristics, options thereof available to be selected to launch a second subsequent network page of the user interface.

3. The computing device of claim 1, wherein the plurality of part numbers included in the database are narrowed to a first subset in response to user selection of a first option of the limited list of options of the first characteristic displayed within the first network page, the first subset being specific to the first option.

4. The computing device of claim 3, wherein the first subset is further narrowed to a second subset in response to user selection of a second option of limited list of options of a second characteristic displayed within the subsequent network page, the second subset being specific to the first option of the first characteristic and the second option of the second characteristic.

5. The computing device of claim 1, wherein the first network page of the user interface further displays one or more elements providing information of one of the first characteristic, wherein the one or more elements are selectable to launch a pop-up window within the user interface, the pop-up window providing additional information of the second characteristic.

6. The computing device of claim 1, wherein the user interface further displays a selectable link of an item that, when selected, launch a commerce network page for the item connected to an electronic commerce system.

7. The computing device of claim 1, wherein the one or more driveshaft characteristics are determinable by physical measurement or visual inspection of the driveshaft when component identification markings on the driveshaft are unavailable, and wherein the user interface further displays instructional content for physically measuring at least one of the one or more driveshaft characteristics, the instructional content comprising at least one of instructional diagrams showing measurement techniques for determining a respective characteristic, instructional videos demonstrating physical measurement for determining the respective characteristic, and instructional labels indicating measurement locations on the driveshaft.

8. A method for a web-based step-by-step interactive search system, the method comprising:

accessing a database that stores a plurality of original equipment manufacturer (OEM) part numbers and a plurality of driveshaft characteristics, wherein each driveshaft characteristic comprises one or more options that each correspond to one or more of the plurality of OEM part numbers;

for at least one of the plurality of driveshaft characteristics, displaying, via a network page, instructional content for determining a corresponding driveshaft characteristic by physical measurement or visual inspection of a driveshaft of interest;

receiving user inputs selecting an option of each of the plurality of characteristics of the driveshaft of interest, wherein the plurality of driveshaft characteristics are determinable from the driveshaft of interest itself without reference to vehicle make or model information;

sequentially filtering the plurality of OEM part numbers based on each option of the plurality of characteristics selected by the user inputs; and identifying an OEM part number for the driveshaft based on the selected options of the plurality of characteristics.

9. The method of claim 8, wherein the plurality of characteristics of the driveshaft includes at least three of: driveshaft position, tubing presence, U-joint series, U-joint style, tube length, collapsed length, installed length, tubing diameter, yoke phase, and yoke angle.

10. The method of claim 8, wherein the instructional content comprises at least one of instructional diagrams showing measurement techniques for determining one or more of tube length, collapsed length, installed length, tubing diameter, and yoke angle, instructional videos demonstrating measurement for determining one or more of tube length, collapsed length, installed length, tubing diameter, and yoke angle, and instructional labels indicating measurement locations for one or more of tube length, collapsed length, installed length, tubing diameter, and yoke angle.

11. The method of claim 8, wherein the network page is one of one or more network pages and the method further comprises displaying the one or more network pages to a user, each of the one or more network pages including a plurality of selectable elements that when selected trigger display of a subsequent network page and filtering of the plurality of OEM part numbers.

12. The method of claim 8, wherein the instructional content comprises one or more of instructional diagrams, instructional videos, and instructional labels, wherein at least a portion of the instructional diagrams, instructional videos, and instructional labels are selectable to provide additional information regarding the one or more characteristics.

13. The method of claim 8, wherein sequentially filtering the plurality of OEM part numbers comprises determining a first subset of the plurality of OEM part numbers based on user selection of the option of a first characteristic and determining a second subset of the first subset of the plurality of OEM part numbers based on user selection of the option of a second characteristic.

14. The method of claim 8, further comprising displaying to a user the identified OEM part number corresponding to the driveshaft within a final network page.

15. The method of claim 14, further comprising displaying a commerce network page in response to user selection of a selectable link within the final network page, wherein the commerce network page allows for purchase of the driveshaft via an electronic commerce system.

16. A computing system for web-based step-by-step interactive searching, comprising:

a processor of a computing device connected to a network;

non-transitory memory including instructions that when executed by the processor enable the computing system to:

access a database storing a plurality of OEM part numbers and a plurality of characteristics for each of the plurality of OEM part numbers, wherein the plurality of OEM part numbers are options for potentially suitable driveshafts available for a given vehicle, wherein at least one of the plurality of characteristics is measurable on a driveshaft and is not determinable by vehicle identification alone;

receive user selections of an option for each of one or more characteristics of a driveshaft; and filter the plurality of OEM part numbers in response to the user selections; and one or more network pages of a user interface displayed on a display screen of a user device in communication with the computing device via the network, the one or more network pages displaying selectable elements indicating options for each of the plurality of characteristics, wherein the user selections are inputted into the user interface.

17. The computing system of claim 16, wherein the plurality of characteristics includes two or more of driveshaft position, tubing presence, U-joint series, U-joint style, tube length, installed length, collapsed length, tubing diameter, yoke phase, and yoke angle.

18. The computing system of claim 16, wherein a first network page of the one or more network pages includes a plurality of selectable elements that when selected trigger display of a second network page, the second network page displaying information specific to a first characteristic of the plurality of characteristics.

19. The computing system of claim 18, wherein the second network page further includes one or more selectable elements that when hovered over provide information of a second characteristic of the plurality of characteristics, information of the second characteristic being specific to a selected option of the first characteristic.

20. The computing system of claim 16, wherein instructions included in the non-transitory memory further enable the processor to determine an OEM part number corresponding to the driveshaft based on sequential filtering of the plurality of OEM part numbers based on user inputs to the user interface, the OEM part number being displayed in a final network page of the user interface.

* * * * *